(12) United States Patent
Tandon

(10) Patent No.: US 9,241,011 B2
(45) Date of Patent: *Jan. 19, 2016

(54) METHOD AND SYSTEM FOR ASSESSING CUMULATIVE ACCESS ENTITLEMENTS OF AN ENTITY IN A SYSTEM

(71) Applicant: Sanjay Tandon, Newport Beach, CA (US)

(72) Inventor: Sanjay Tandon, Newport Beach, CA (US)

(73) Assignee: Sanjay Tandon, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,161

(22) Filed: Sep. 22, 2014

(65) Prior Publication Data

US 2015/0012966 A1 Jan. 8, 2015

Related U.S. Application Data

(63) Continuation of application No. 13/868,961, filed on Apr. 23, 2013, now Pat. No. 8,843,994, which is a continuation of application No. 11/767,351, filed on Jun. 22, 2007, now Pat. No. 8,429,708.

(60) Provisional application No. 60/816,218, filed on Jun. 23, 2006.

(51) Int. Cl.
*G06F 21/00* (2013.01)
*H04L 29/06* (2006.01)
*G06F 21/31* (2013.01)
*G06F 21/60* (2013.01)

(52) U.S. Cl.
CPC ............... *H04L 63/20* (2013.01); *G06F 21/00* (2013.01); *G06F 21/31* (2013.01); *G06F 21/604* (2013.01); *H04L 63/08* (2013.01); *H04L 63/101* (2013.01); *G06F 2221/2141* (2013.01); *G06F 2221/2145* (2013.01)

(58) Field of Classification Search
CPC ......................................................... G06F 21/31
USPC ............................................................. 726/1
See application file for complete search history.

(56) References Cited

U.S. PATENT DOCUMENTS

| | | | |
|---|---|---|---|
| 7,155,534 B1 * | 12/2006 | Meseck et al. | 709/238 |
| 7,437,755 B2 * | 10/2008 | Farino et al. | 726/5 |
| 7,634,252 B2 * | 12/2009 | Groenendaal et al. | 455/410 |
| 7,680,822 B1 * | 3/2010 | Vyas | G06F 21/604 707/781 |
| 7,716,247 B2 * | 5/2010 | Brjazovski et al. | 707/792 |
| 2002/0019941 A1 * | 2/2002 | Chan et al. | 713/185 |
| 2002/0026592 A1 * | 2/2002 | Gavrila et al. | 713/201 |
| 2002/0099952 A1 * | 7/2002 | Lambert et al. | 713/200 |
| 2003/0055991 A1 * | 3/2003 | Krishnapuram et al. | 709/229 |
| 2006/0056618 A1 * | 3/2006 | Aggarwal et al. | 380/1 |
| 2006/0149831 A1 * | 7/2006 | Dutta et al. | 709/217 |
| 2006/0236250 A1 * | 10/2006 | Gargi | 715/753 |
| 2007/0214340 A1 * | 9/2007 | Leveille et al. | 711/203 |

\* cited by examiner

*Primary Examiner* — Morshed Mehedi
(74) *Attorney, Agent, or Firm* — Haynes and Boone, LLP

(57) ABSTRACT

A method and system is provided for assessing the cumulative set of access entitlements to which an entity, of an information system, may be implicitly or explicitly authorized, by virtue of the universe of authorization intent specifications that exist across that information system, or a specified subset thereof, that specify access for that entity or for any entity collectives with which that entity may be directly or transitively affiliated. The effective system-level access granted to the user based upon operating system rules or according to access check methodologies is determined and mapped to administrative tasks to arrive at the cumulative set of access entitlements authorized for the user.

30 Claims, 20 Drawing Sheets

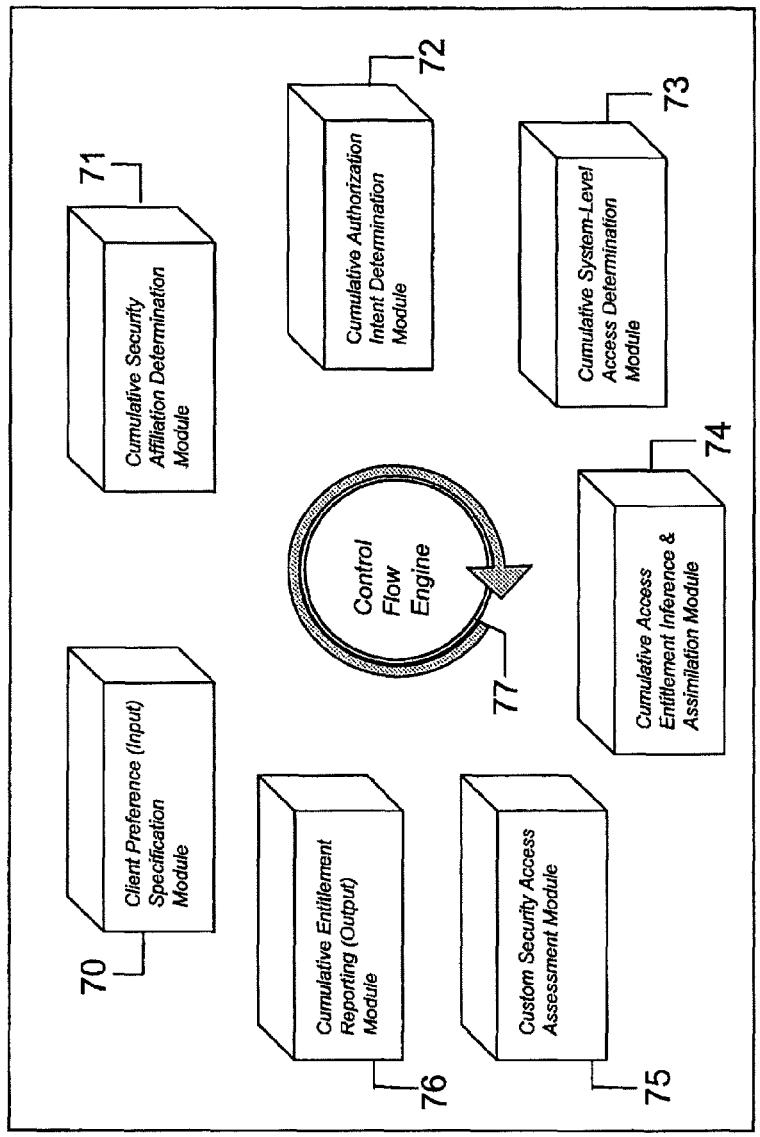
FIG. 13
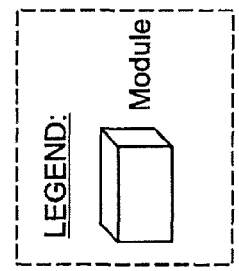

**User *John Doe* has the following entitlements in the system:  FIG. 20**

1. *John Doe* can create the following user account(s) in the following containers:
    a. *Global Users*
    b. *NY Users*

2. *John Doe* can disable the following user account(s)
    a. *Kevin Williams*
    b. *Jackson King*

3. *John Doe* can reset the passwords of the following user account(s)
    a. *Jackson King*
    b. *Sandra Engelhard*

4. *John Doe* can create security group(s) in the following container(s):
    a. *NY Resource Groups*
    b. *Williams Team Groups*

5. *John Doe* can modify the membership of the following security group(s)
    a. *NY Administrative Assistants*
    b. *NY Employees*
    c. *Global Sales Team*

6. *John Doe* can modify the security policy of the following computer(s)
    a. *Oceans 12 - Server*
    b. *Everest - Desktop*
    c. ...

7. *John Doe* can backup information assets on the following computer(s)
    a. *Oceans 12 - Server*
    b. *Everest - Desktop*
    c. *Sara - Laptop*

8. *John Doe* can modify the security policy of the following router(s)
    a. *Intranet Cisco Router13*
    b. *Intranet Cisco Router 18*
    c. *Extranet Cisco Router 05*

9. *John Doe* can send email as the following user(s)
    a. *Sara Williams*
    b. *Joanne Kennedy*

10. *John Doe* can access the following information asset(s)
    a. *CIO Security Strategy document*
    b. *CTO Information Assets List*
    c. ...
    z. *Global Employee Operations Manual*

11. ...

165. *John Doe* can administer the following information assets:
    a. *International Sales Strategy document*
    b. *NY Employees Contact List*
    c. ...
    z. *Marketing Budget Executive Summary*

METHOD AND SYSTEM FOR ASSESSING CUMULATIVE ACCESS ENTITLEMENTS OF AN ENTITY IN A SYSTEM

RELATED APPLICATION

This application is a continuation of U.S. application Ser. No. 13/868,961, filed Apr. 23, 2013, which is a continuation of Ser. No. 11/767,351, filed Jun. 23, 2007, now issued as U.S. Pat. No. 8,429,708, which in turn claims the benefit of U.S. Provisional Application No. 60/816,218, filed Jun. 23, 2006.

BACKGROUND OF THE INVENTION

The invention relates generally to information and computer systems and networks security, and more particularly to a method and system for assessing the cumulative access entitlements of an entity, for example a user, or a collective thereof, of an information system.

It may be noted that from hereon, the word entity and user may usually be used interchangeably. It may additionally be noted that a user's security affiliations include the user's identity.

It may further be noted that from hereon, the terms administrative tasks, business tasks, business functions and computing tasks all serve to denote the various abilities to which the entities of an information system may be entitled by virtue of the cumulative access entitlements that exist in the information system for these entities. These terms may thus be used interchangeably from hereon in this document.

Information Systems & Information Security

An information system may be viewed as one comprised of (i) a standalone computing device or a networked set of computing devices, that usually exist to provide some computing service, and that usually run some sort of a control program such as an operating system, and that are usually referred to as IT assets, and the information system may optionally be additionally comprised of and (ii) the information assets that these entities may create, consume, store, process, share and manage as a part of their work. In some instances, an information system may also be considered to comprise (iii) a set of entities, for example users, that use these IT assets (for example computing devices and the services they offer)

Information security has become an important aspect of doing business today. Every IT and information asset should be adequately protected across all aspects of its lifecycle (i.e. creation, storage, communication and consumption/use) to a degree consistent with the value of the asset. Thus, most information systems usually provide a fundamental set of security services that together deliver numerous protection capabilities that preferably enable the protection of information assets.

A set of security services usually includes authentication, authorization and, at times, auditing. Authentication usually involves limiting access to the information system to a known and identifiable set of entities, for example users. Authorization, also referred to as access-control, usually involves the specification and enforcement of authorization intent dictating the type of access a user of an information system has on an information or IT asset, or a set thereof. Auditing, an accountability measure, is usually the means by which a record of an occurrence of a computing/business task/action by an entity of the system can usually be created, ideally irrefutably, and usually archived.

Authorization

Every IT and information asset usually has an owner who usually has complete control over that asset and can thus usually also authorize other users of the information system to access that asset. Access to an asset is a generic term, and is usually qualified by specifying the nature of access authorized, such as read, modify, create and delete access. In addition, the owner of an asset may also grant (or authorize) another entity such as a user, or a set of entities, such as a group of users the ability to control access to the asset itself. Finally, the ownership of an object can usually be transferred, and in certain cases, also be seized by another user whose administrative powers exceed or equal that of the current owner of the asset.

The act of specifying who has what access to an asset is usually referred to as specifying authorization intent. An information system preferably allows entities, such as users, to specify authorization intent for protecting IT and information assets. In addition, in certain information systems, the system itself usually ships with some pre-specified basic level of default authorization intents specified on information and IT assets, usually aimed at providing varying levels of default access to different generic sets of users in the system. In most systems, the combination of system pre-specified authorization intents and user-specified authorization intents is usually collectively enforced when a user of the information system attempts to access this information/IT asset. Also, in most systems, access is usually enforced by means of an access check.

Authorization and Entitlements

As it pertains to information security/access control, in most systems, authorization involves the specification and enforcement of authorization intent which dictates the access an entity has on an asset. This authorization intent, in effect authorizes the entity to perform a specific system-level operation on the securable resource that it serves to protect.

In most systems, the specification of authorization intent almost always involves an explicit grant or denial of some low-level (system-level) permission that authorizes the ability to perform a corresponding system-level operation on some securable resource or on some unit of data that may either itself constitute, or be a part of a securable resource, which in turn by itself or as a part of a bigger collective, may represent a unique information or IT asset.

Also, in most systems, by design, a system-level operation that is performable on a specific type of unit of data in the system may correspond to a specific high level administrative task or business function that may be performable in the system. For example, a low-level create operation involving the creation of a data structure representing a user account in the system, corresponds to a high-level administrative task of creating a user account for an entity in the system.

Consequently, existent authorization intent, in effect also entitles the entity to be able to perform a specific administrative task on the asset that it serves to protect; the specific administrative task entitled being a function of (i) the specific system-level operation authorized and (ii) a function of the type and nature of this securable resource.

It thus follows that in most systems, the ability of an entity, such as a user to perform a specific high-level administrative task or business function is dependent on the existence of permissions specified in authorization intent specifications for that entity in the system, that authorize the execution of the system-level operation that corresponds to this high-level administrative task.

It thus also follows that in most systems, while each individual authorization intent specification explicitly governs the ability of an entity, such as a user, to perform a system-level operation on some securable resource, more importantly, it implicitly governs the ability of that entity to perform a high-level administrative task on information or IT asset that the securable resource represents.

It finally follows that as it pertains to information security in general and authorization in particular, every existing authorization intent specification on some securable resource, authorizes the entity specified in that authorization intent specification to perform a specific system-level operation on the securable resource that it serves to protect, and in effect also entitles this entity to be able to perform a specific administrative task on the information or asset that this securable resource represents.

Authorization, Permissions, Operations and Entitlements

The nature of the permissions specified in an authorization intent specification in an information system is usually a function of the underlying implementation of the authorization model and the security resource managers that provide the means to specify authorization intent.

In most information systems, permissions specified in an authorization intent specification that serve to protect a securable resource, typically authorize the subject of the permission to being able to perform some form of system-level operation on the resource. However, in most information systems, the ability to perform a specific system-level operation on a specific type of resource may or may not directly correspond to the ability to perform a specific business level administrative task or function on the business asset represented by that securable resource.

In certain implementations, the set of permissions that may be specified in authorization intent specifications (or the system-level operations that the permissions serve to authorize) directly correspond to a set of specific business or administrative functions, in that the intent, the act and the effect of specifying a permission in an authorization intent specification for an entity, are tantamount to the intent, the act and the effect of authorizing the entity (specified in that authorization intent) to engage or enact the specific business or administrative task or function that maps to this permission. In this case, the presence of a specific permission directly entitles the entity to perform a corresponding specific administrative/business task/function.

In such implementations, an inspection of the permission in an authorization intent specification for an entity readily provides an unambiguous indication of the specific business or administrative function that this intent specification serves to authorize and entitle for this entity.

In other implementations, the set of permissions that may be specified in authorization intent specifications (or the system-level operations that the permissions serve to authorize) do not directly correspond to but rather indirectly map to a set of specific business or administrative functions, in that while the act of specifying a permission in an authorization intent specification for an entity may or may not be intended with the specific purpose of authorizing the entity (specified in that authorization intent) to engage or enact the specific business or administrative function that maps to this permission, the effect of specifying this permission is tantamount to the effect of authorizing the entity (specified in that authorization intent) to engage or enact the specific business or administrative function that maps to this permission. In this case, the presence of a specific permission indirectly entitles the entity to perform a corresponding specific business or administrative function.

In such implementations, where permissions indirectly entitle administrative tasks, there exists a mapping between the set of permissions that may be specified in authorization intent specifications and the set of business or administrative tasks or functions that these permissions have the effect of authorizing for an entity. This mapping introduces a gap in a system and the users of a system are required to be aware of this mapping and manually bridge the gap between the specific permission specified in the authorization intent specification and the corresponding business or administrative function that the existence of this permission ends up authorizing, both during the specification of and during the assessment of authorization intent.

In such implementations, the act of entitling an entity to a specific business or administrative function and the act of assessing the set of entitlements conferred upon an entity, both require the inclusion of this set of mappings between permissions and administrative tasks. This set of mappings is usually delivered in the form of documentation provided by the vendor of the underlying operating system. In some cases, the vendor of the underlying operating system may implement a partial set of such mappings in the user interface that allows users to specify permissions on resources. NOTE: In most information systems, there is typically a one to one correspondence between the permission specified in an authorization intent specification and a specific system-level operation. Thus there typically also exists a mapping between the set of resource-type specific system-level operations (that may be authorized by permissions specified in authorization intent specifications) and the set of business or administrative tasks or functions that these permissions have the effect of authorizing for an entity. Thus, either a set of permission to administrative task entitlements, or a set of system-level-operation to administrative task entitlements may be used to assess the administrative tasks entitled by the presence of specific permissions in authorization intent specifications protecting a securable resource.

In such implementations, an inspection of the permission in an authorization intent specification for an entity, by itself, in no manner provides any indication whatsoever of the specific business or administrative function or functions that this intent specification serves to authorize and entitle for this entity.

It may be noted that while in both implementations, the act of authorizing some access to some user, which involves specifying some permission for the user on an information or IT asset, as manifested in an authorization intent specification, has the effect of entitling the user to perform some administrative task or business function, the act of inspecting the access specified in an authorization intent specification may or may not readily provide an indication of the specific business or administrative function that this intent specification serves to authorize and entitle for this entity. Thus, the nature of the permissions specified in an authorization intent specification in an information system can significantly impact the ease with which an entity's entitlements may be assessed.

The native authorization models of most commercially available operating systems such as Microsoft's Windows family of operating systems primarily implement an authorization scheme where permissions are used to specify access on securable objects and for the most part these permissions do not directly correspond to but rather indirectly map to specific business or administrative functions. Thus, in most information systems, the determination of an entity's access entitlements is a highly non-trivial, complex and intensive task.

Cumulative Entitlements

As it pertains to an entity, such as a user of an information system, the entity's cumulative entitlements refer to the resultant set of all administrative tasks/business functions that the entity is authorized to (i.e. entitled to) perform by virtue of the cumulative access granted to this entity or any of its security affiliations, across the information system, or a specified subset thereof, as specified in authorization intent specifications that serve to protect individual or collective information or IT assets and that cumulatively govern the overall access granted or denied to this entity or any of its security affiliations, across the information system, or a specified subset thereof.

For example, consider an information system comprised of a set of information and IT assets and a set of administrators and users. The system administrators may over time grant various permissions to various users in effect authorizing them the ability to perform certain administrative tasks. Note that different administrators may grant the same user different permissions in different parts of the system, so as to authorize for the user, the ability to perform some business function or administrative task, as dictated by the business needs. At any given point in time, the user's cumulative access entitlements would then consist of the set of all administrative tasks across the entire information system, that are authorized by the presence of all existent permissions that grant this user or a security group that the user is a member of, some form of access on some information or IT asset across the information system, which in effect entitles the user to perform some administrative task of business function related to that information or IT asset.

Cumulative Entitlements and their Assessment

In most information systems today, there usually exist a large set of authorization intent specifications across the information system. Each expression of authorization intent is usually implicitly or explicitly tied to the asset that it serves to protect and at a minimum specifies the entity i.e. subject or principal for whom access is being specified and the nature and optionally the level of access that is being specified. An information system usually offers the means by which its entities, such as users, can be represented and uniquely identified and authenticated. In addition, most information systems usually also offer the means to collectively specify a set of entities, such as users, for the purpose of specifying authorization intent. While such means could take many forms (e.g. groups, roles etc.) the system ensures that each such collective can also be uniquely identified. Thus, at its simplest, usually, every expression of authorization intent includes a unique identifier for an entity such as a user, or a collective of entities for whom access is being granted.

As it pertains to scale, the simplest information system is one that is comprised of a single computing device representing a single IT asset and a set of zero or more information assets that exist on that device, and finally a single entity, such as a user of the information system comprised of the above information and IT assets. In this simplest of cases, there would be an expression of authorization intent governing this entity's access (use) to the computing device (an IT asset) and further one or numerous expressions of authorization intent governing the entity's access to the various information assets that exist on that computing device.

On the other end of the scale spectrum, a large and complex information system could be comprised of a very large number (to the tune of hundreds of thousands or even millions) of connected computing devices (representing IT assets) with an equally or exceedingly large number of information assets collectively being stored on the entirety of these devices and finally a very large number of entities, such as users, of the information system comprised of the above information and IT assets. In this case, there would be a very large collective number of expressions of authorization intent governing various aspects including individual and collective accesses to computing devices (IT assets) and governing the various ways in which the large number of entities, such as users, of this system may individually and collectively access any/every one of a large number of information assets that exist on that entirety of this large number of computing devices.

As it pertains to an individual entity, such as a user, this implies that that the cumulative set of authorization intent specifications that exist for a specific entity across the information system, is comprised of the collection of a large number of individual authorization intent specifications, each of which (i) are usually specified as a part of a set of authorization intent specifications on one of a large number of individual information or IT assets across the information system, each of which may be owned or managed by numerous other entities (ii) are usually specified by another entity in the system, who typically own or manage these assets and (iii) each of which specifies permissions either for this specific entity or for some collective to which this specific entity belongs.

For example, consider an information system, in which there exist thousands of individual information and IT assets and hundreds of users. Each information and IT asset usually has an owner who specifies authorization intents protecting these assets. These authorization intent specifications are usually specified in an authorization list protecting the asset and each individual authorization intent specification specifies the nature and type of access granted for others users and groups in the information system. Thus, for a given user, there may exist thousands of individual authorization intent specifications each existing in authorization lists on hundreds of information or IT assets, and each specifying some access either for this user or for a group to which this user may directly or indirectly belong. Also as illustrated by this example, each of the hundreds or thousands of information or IT assets, whose authorization lists contain authorization intent specifications for this user, are usually owned or managed by a large set of different users.

Additionally, as mentioned above, in most information systems, these authorization intent specifications explicitly only authorize low-level operations on data; thus introducing a gap wherein the corresponding high-level administrative tasks or business function that is authorized needs to be somehow inferred by the user or an administrator of the system.

It may further be noted this large set of authorization intents is neither specified by a sole entity (user) nor is a sole entity (user) in the know of the entirety of authorization intents that exist across the information system. On the contrary, the individual acts involving these specifications of authorization intent are usually independent events enacted by a large number of unique entities of the system, each typically motivated by a desire or a need to protect individual information/IT assets. Additionally, unbeknownst to any one single entity, in their entirety the specified authorization intents cumulatively and implicitly or explicitly result in a large set of authorizations for a large set of entities, such as users, across the information system. It may also be noted that in most information systems today, as such, no single entity (user) is usually in the know of the entirety of authorization intents to which they themselves or another entity may be authorized access. As noted above, the word entity and user may usually be used interchangeably. Also, as noted above, unbeknownst to any one single entity, in their entirety the specified authorization intents cumulatively and implicitly or explicitly result in a large set of authorizations for a large set of users, across the information system.

As a consequence it follows that every user in an information system is in actuality implicitly or explicitly entitled to a large set of specific business or administrative tasks or functions, the collective scope of which may span large parts of the information system. It was also noted above that the large set of authorization intents that exist in an information system are neither specified by a sole entity (user) nor is a sole entity (user) in the know of this entirety.

As a consequence, it follows that, in most information systems today, the cumulative set of a user's entitlements are neither known to the user him/herself nor known to any other single entity in the information system. Also as noted above, the users of an information system usually have a business need to be able to specify authorization intent in terms of authorizing the ability to perform administrative tasks. However, most implementations only allow users to specify low-level permissions in an authorization intent specification. Thus, in most implementations, there exists a mapping between the set of administrative tasks and the corresponding set of low-level permissions on specific data types that are required to authorize these administrative tasks. The users of such a system are required to be aware of and take into account this mapping both while specifying authorization intent and while determining the set of entitlements that exist in a system for a user. In such implementations, it could very well be the case that a user while specifying authorization intent for a specific information/IT asset may not completely understand or be unaware of the ramifications of granting a specific type of access on that asset to a specific user or a collective of users.

As a consequence, it follows that there may exist authorization intents for a user of a system that end up entitling the user to specific business or administrative functions that in fact were never meant to be authorized for that user, but that nonetheless are authorized, primarily because of human error introduced during the act of authorizing access.

Furthermore, when granting access to a collective of users, the owner or the manager of an asset, may not realize that anyone who controls or could obtain the means to control or modify the membership of that collective could in effect end up implicitly authorizing access for another entity to this asset, even though the owner or the manager of the asset who used that group to specify access to this asset, may never have intended to allow such access to the additional entities that may now be a part of that modified collective, and thus have access to that asset by virtue of being a member of a collective to which this owner or manager has authorized access. As a consequence, it follows that there may exist authorization intents for a user of a system that end up entitling the user to specific business or administrative functions that in fact they were never supposed to possess or acquire the ability to engage in.

Thus, it follows that the cumulative entitlements of users in an information system may (i) be very large, (ii) span various parts of the information system, (iii) in its entirety, neither be known to the user him/herself nor to any other entity in the information system, including the administrators of the information system and the owners of various information assets and finally (iv) entitle the user to excessive access i.e. the ability to perform specific business or administrative functions that in fact they were never supposed to possess or acquire the ability to engage in, from the perspective of business policy.

Ramifications of Excessive Cumulative Entitlements

The presence of excessive or unauthorized (by policy) entitlements in an information system significantly endanger the entirety of an organization's information and IT assets. Furthermore, their oblivious continued presence poses a greater risk because it allows such vulnerabilities to go unnoticed by administrative or security personnel and exist for long periods of time, thereby significantly increasing the likelihood of the discovery and subsequent misuse of these vulnerabilities by malicious individuals.

To be more specific, the presence of a user's excessive entitlements can be grossly misused either by the user or by any malicious party that may come to learn of their existence either accidentally or intentionally. A malicious user could misuse the presence of excessive entitlements and the knowledge thereof to escalate his/her privilege and potentially compromise one or more information or IT assets to which he/she him/herself may not be authorized access. A shrewd malicious user could not only compromise another asset but also implicate the user whose entitlements were used to compromise the asset thereby causing harming to the user whose entitlements were misused and leaving the victim user with no way of claiming or providing proof of his/her innocence.

A Real World Illustration

This problem is best illustrated by a real example of its manifestation in over 80% of IT information systems across the world, each of which run on Microsoft Corporation's Windows server and client family of operating systems. It is a well established fact that information security is fundamentally about access management. Access management involves the authentication of users, the authorization of access to resources and the auditing of the execution of some user-specifiable administrative/computing tasks/functions. These facilities in turn require the presence of user accounts for user identification and authentication, and it also requires the specification of authorization intent on resources, so as to be able to specify who has what access on a given resource.

In information systems running on Microsoft's Windows server and client family operating systems, at the heart of access management is the Active Directory, an enterprise directory service that plays a central role in user authentication, resource authorization and access auditing, in addition to playing the role of an enterprise directory that is used for resource location.

From a technical perspective, the Active Directory is a hierarchical, object-oriented information store. It ships with a schema that contains pre-defined definitions of numerous object classes, each comprised of a finite set of attributes. The purpose of each object class and attribute in the schema is defined by the designers of the Windows operating system. These schema definitions define objects that represent users, security groups, computers, printers and other resources.

In a Windows Server based information system, user accounts are represented by instantiations of objects of class user in the Active Directory; similarly security groups and computers are represented by instantiations of objects of class group and computer respectively. The same is true for various other categories of resources including printers and service connection points.

One consequence of the above aspect is that in a Windows Server based IT infrastructure, administrative tasks associated with the management of resources involve the creation of specific object types in the Active Directory and the initial setting and subsequent modification of the values of the attributes that these objects are compromised of.

For example, the administrative task of creating user accounts amounts to the creation of an object of class user in the Active Directory. Similarly the administrative task of creating security groups amounts to the creation of an object of class group in the Active Directory. On the same note, the administrative task of disabling a user account involves the modification of the user-account-control attribute on the specific user account object, and the administrative task involving the modification of a security group membership involves the modification of the member attribute on the group object representing that group.

In this manner, almost every administrative task in almost every administrative category such as account, group, computer and printer management, involves the creation, modification or deletion of object classes and attributes in the Active Directory. Microsoft Windows based information systems are usually large and comprise of thousands of user accounts, computers, security groups and resources, each of which needs to be managed. Because it is infeasible for a small set of administrators to manage such a large set of resources, Active Directory offers a powerful capability that allows administrators to distribute and delegate the various aspects of management of these resources between a large number of relatively less powerful administrators and between the users of the system themselves.

This powerful capability is enabled by Active Directory's authorization model, which provides administrators the ability to grant a user or a security group a set of specific permissions on objects in the Active Directory. Each object is protected by an access control list (ACL), which contains a set of zero or more access control entries (ACEs), each of which specifies a set of one or more permissions for a user or a security group on that object.

In Active Directory, there exist a basic set of permissions corresponding to the basic low-level operations that can be performed on objects and attributes. These basic low-level operations include list (a) child (object), create (new instance of) object, delete (an existing instance of) object, read-property (i.e. attribute), and write-property. The basic set of corresponding permissions in Active Directory include list child, create object, delete object, read-property and write-property. In addition, there also exist certain advanced permissions such as modify owner and modify permissions, and there exist a small number of specific special permissions. Together, these set of permissions in Active Directory control the ability of a user to perform a low-level operation on an object Each basic low-level data operation on a specific class of object or one of its attributes maps to a specific administrative task and thus entitles a user to perform some administrative task. Most administrative operations involve the creation or deletion of objects and/or the reading or modification of attributes on objects. Because Active Directory provides the means by which each of these low-level operations can be authorized to a user, in effect Active Directory allows administrators the ability to grant lesser privileged administrators and user themselves the precise set of permissions (on specific objects) that are required to perform one or more administrative tasks. In this manner, administrative entitlements are conferred upon lesser privileged administrators and users themselves.

It is not uncommon for a lesser-privileged administrator to be granted permissions on thousands of objects over the lifetime of their employment in that capacity. Also, in many cases delegated administrators may themselves be allowed to further sub-delegate administrative authority to other delegated administrators and users.

Over a long period of time, hundreds of administrative personnel and users may end up having permissions granted to them on thousands of different objects in the Active Directory. Over time, it may also very well be that while the administrative responsibilities assigned to a delegated administrator may change, the set of permissions assigned to him/her or to a group to which he/she might belong may not be removed, either due to administrative oversight or for a variety of other reasons, and thus may continue to exist thereby continuing to allow him/her the ability to perform an administrative task to which he/she should ideally no longer be entitled to perform.

It may be noted that a simple evaluation of these permissions will in no manner allow a user to infer the set of administrative tasks that these permissions grant to a user or to a group. This is because while Active Directory allows for permissions to be specified, it provides no facility for an administrator that is specifying a permission to describe or annotate it with the reason or intent governing the specification of this permission. Thus, while the ACEs in the ACLS on each one of thousands of objects in the Active Directory specify what permissions a specific user or group has, they do contain no information that might provide any indication as to why that permission exists in that ACE. As a consequence, when an administrator views an ACL on any one of thousands of objects in the directory, all he or she sees is a list of low-level permissions granted to a set of users or groups.

A related issue is that of attempting to determine the list of all users to whom a specific administrative task may be authorized by virtue of an ACE that exists on an object that grants some permission to a security group. The mere evaluation of this ACE will neither reveal what administrative task it entitles the members of this group to, nor will it reveal the members of this group. Furthermore, it is not sufficient to simply read the member attribute of the corresponding group object in Active Directory, as group memberships can be transitive in nature, and this transitive in nature is not reflected in the member attribute of the group object—it must be evaluated. For example, a group could be a member of another group which in turn could be a member of another group. A simple inspection of the member attribute of this third group will only reveal that the second group is a direct member of it; it will not reveal that the first group in turn is a member of this second group and thus in fact is also a member of the third group. Thus, a simple evaluation of these permissions will in no manner provide any indication as to the entire set of users that may be entitled to performing either the low-level operation or the corresponding administrative task that corresponds to the presence of those permissions on that object.

It may also be noted that for any given user, the set of permissions that cumulatively allow him or her (either directly or transitively) the ability to perform a set of low-level operations on a set of objects (, and thus perform all corresponding high-level administrative tasks,) may exist in thousands of ACEs, each one belong to the ACL of one of thousands of objects. It may further be noted that these permissions would typically not have been provisioned by a single administrator, but rather provisioned by numerous administrators, each of whom may belong to different groups, and may only be responsible for managing isolated subsets of resources. Thus, in all likelihood, no single administrator in the system would know about the entire set of permissions that exist for any one of thousands of users or security groups.

As a consequence, it may very well be that a user or a delegated administrator may be entitled to performing a large set of administrative tasks in the system. Also, neither the user him or herself nor any administrator in the system would have knowledge of the entirety of administrative tasks that the user is actually authorized to perform across the information system. Additionally, there may exist excessive entitlements in the system, and these may end up granting entitlements that may be in violation of security policy. Finally, a simple evaluation of ACLs on objects will neither reveal the cumulative set of operations that are authorized by the presence of the ACEs in that ACL, nor will they reveal information about the cumulative set of users who may entitled to performing the various administrative tasks that corresponds to the presence of the permissions specified in these ACEs.

Thus at any given point in time, an ordinary user or a delegated administrator of the system may very well be entitled to creating new user accounts or groups, resetting the passwords of or disabling a large number of user accounts, modifying potentially sensitive and confidential information on user accounts, modifying the group membership of a large number of security groups each of which in turn may have been used at thousands of places in the system to specify access on thousands of resources, etc.

This problem is not limited to the existence of large numbers of user entitlements, each of which may span various administrative categories and in a direct or indirect manner be related to some permission granted on one of thousands of objects that exist in the Active Directory. It in fact extends to include access that may be provisioned for thousands of users to access thousands of hosts that are a part of the IT infrastructure and to further include access that may be provisioned to thousands of information assets that reside on these hosts—examples of such information assets include trade secrets, product blue-prints, business plans, competitive strategies, business intelligence, strategic and tactical plans, financials, customers records, employee records, operational and security blue-prints, information exchange between employees, customers, executives & other stakeholders etc., all of which may exist as individual documents or as contents of databases, access to each of which could be obtained directly or via a service. In its entirety, this is a real problem and one that poses a major challenge in the ability of organizations around the world to secure access to their information and IT assets.

In any moderate to large information system, there exist hundreds of thousands individual authorization intent specifications each of which is attached to one of hundreds of thousands of information assets, multiple copies of each of which may reside on thousands of computing devices (IT assets), each gated by one of many different kinds of resource managers that exist across the information system and each one authorizing an operation or a task, the inference of which requires contextual knowledge which is usually an inferred function of the type of asset being protected and the specific nature of access specified in the authorization entitlement.

Even at best, any such measures would fall far short in their attempts to arrive at a meaningful (complete and accurate) list of a user's cumulative entitlements across the information system, primarily because the vast amounts of information that would have to be assessed, sifted and subsequently processed (to account for context), to arrive at a meaningful list, and the extraordinarily inordinate amount of time that a manual assessment of the same would require, would in itself make any manual attempts virtually useless, especially considering that it in order for such information to be at all useful, it would have to be of arrived at very quickly, given its time sensitive nature.

Benefits of Cumulative Assess Entitlements

There are numerous benefits in being successfully able to assess the cumulative assessments of an entity in an information system. Such an assessment could be used to determine the set of all administrative tasks or business functions that a user is entitled to performing across the information system. It could also be used to discover the presence of insecure or weak or unauthorized permissions that allow a user to perform some task that he or she should not be allowed to perform. It may further be used to determine the set of all users who may be able to perform a given task in an information system. It may also be used to identify the presence of privilege escalation paths in the system. Additional benefits of this ability will be apparent to those of ordinary skill in the art.

One's ability to successfully and accurately assess the entitlements of an entity in a system is dependent on numerous factors including the nature of authorization intent specifications that exist in the system, the use of security affiliations, the presence of different types of resource managers that collectively gate access to the various information and IT assets across an information system, the vast expanse of the information system and the inclusion of numerous other dynamics that may be specific to the implementation of the authorization model underlying the various parts of an information system.

SUMMARY OF THE INVENTION

This invention provides a method and system for assessing the cumulative set of entitlements to which an entity, such as a user, or a collective thereof, of an information system may be implicitly or explicitly authorized, by virtue of the universe of all authorization intent specifications that exist across that information system, or a specified subset thereof, for that entity and/or for any collective affiliations with which that entity may be directly or transitively affiliated.

In one aspect, the method and system for arriving at an entity's cumulative entitlements across the information system involves:

1. A determination of a set security affiliations of the entity across the information system, or a specified subset thereof, followed by 2. A determination of a set of authorization intent specifications that pertain to this set of security affiliations, followed by 3. A determination of the system-level access granted to the entity in view of this set of authorization intent specifications, and at least some access check methodologies implemented in the computer system, followed by 4. A determination of the entity's cumulative access entitlement set by application of system-level access to administrative task mappings, optionally followed by, Furthermore, in other aspects, the method and system for arriving at an entity's cumulative entitlements across the information system may furthermore be utilized to perform additional cumulative access related security assessments, such as but not limited to determining the cumulative access granted to all entities in a system, determining the identity of all entities that may be entitled to performing a specific task, uncovering existing security access entitlements that allow privilege escalation etc.

Determining the Entity's Cumulative Security Affiliations

In some embodiments the invention determines the cumulative set of all security affiliations of the user whose entitlements the method and system is tasked with the determination of. Such a determination is usually an integral part of this determination because the cumulative entitlements of a user are usually not solely the function of what the user him/herself is authorized access to but rather and usually a function of the authorizations granted to the user him/herself and additionally the set of all authorizations granted to any collective (e.g. security groups) that the user may be affiliated with (or a part of) directly or transitively.

It is common and in actuality usually a norm for the owners and protectors of an information or IT asset to grant access to collectives rather than individual users. The specific types and kinds of collectives used in an information system are usually a function of the security model implemented by the underlying operating system. Two of the most common collectives include security group memberships and administrative or business function role definitions. Most commercial operating systems offer the use of either or both collectives and within each collective there usually exist various sub-types, and these sub-types usually vary in the scope in which they are applicable and in the specific computing environment in which they may be effective. A user could be a member of a large number of collectives, each of which may be of varying sub-types, and each of which in turn could be members of other collectives.

In order to evaluate the complete set of a user's cumulative entitlements, it is imperative to first evaluate the complete set of collectives that will come into play when the user is engaged in a computing session during which he/she might attempt to access the resources of the information system. The set of a user's collectives that come into play when the user is engaged in a computing session is implementation specific and usually differs from system to system. The evaluation of a user's complete set of collectives is thus a highly complex evaluation. One of the salient aspects of this invention is the adroit skill with which the method accurately arrives at a user's complete set of collectives that will come into play when the user is engaged in a computing session.

Determining the Entity's Authorization Intent Specifications

In some embodiments this invention determines or discovers all individual authorization intent specifications that exist across the universe of information and IT assets in the information system and then queues this set of individual authorization intent specifications. It may be noted that usually each of these individual authorization intent specifications exist as a part of a larger unit of authorization intent specifications, (which for the purposes of discussion shall from hereon be referred to as an authorization lists). A single authorization list protects a single specific information or IT asset.

Thus, in effect, in some embodiments this invention involves parsing a very large number of authorization lists, extracting and evaluating the individual authorization intent specifications from within these lists, and making a determination as to whether or not each of these individual authorization intent specifications grant access to the user or to any collective of which the user may be a part, or to which the user may be affiliated, either directly or transitively, and if so, queuing each such individual authorization intent specification for subsequent processing.

Note that in some embodiments this invention may also involve taking into account various aspects that may be specific to the implementation of the authorization model underlying the various parts of an information system. For example, in this determination, the method and system of this invention may additionally evaluate whether or not an individual authorization intent specification is considered effective for the purposes of an access check and accordingly only take into account all effective individual authorization intent specification.

Determining the Entity's Cumulative System Level Access

In some embodiments this invention determines the effective cumulative system access i.e. the cumulative set of all system level operations that this user is authorized to perform (and the target resources or information/IT assets on which the user can perform these system level access operations) by virtue of the universe of authorization intent specifications that specify some access for this user and for any of his security affiliations across the information system, or a client specified subset thereof.

In some embodiments the aforementioned determination of the cumulative set of authorized system level operations is a complex and computation intensive process because it involves taking into account the entity's cumulative authorization intent specifications, and all pertinent aspects of the access check algorithms implemented in the underlying information or operating systems, such as, but not limited to, security token generation, access control entry precedence orders etc.

It may be noted that the inclusion of all pertinent aspects of the access check algorithms implemented in the underlying information or operating systems is a vital aspect of the cumulative access assessment process and could be considered essential for arriving at an accurate access assessment.

Determining the User's Cumulative Entitlements

In some embodiments this invention determines the set of all specific administrative tasks and/or business functions that this user is entitled to, which involves the application of a pre-determined or a dynamically generated set of system level access to administrative task mappings.

Every information or IT asset is represented in the system by an instance of some well-defined data structure. In most operating systems, the access specified governs the system-level operations that can be performed on these well-defined data structures. The ability to perform some specific system-level operation on a well-defined data structure typically maps to the ability to perform some administrative task on a logical business asset. For example, the ability of an administrator to instantiate an object of a well-defined class called User corresponds to the business-level administrative task of creating a new user account for a new user in the system. Thus, a determination of the set of all administrative tasks that a user may be entitled to requires a set of system-level operation to administrative task mappings.

The determination of the mappings between some specified system level access on this information asset and the administrative task that this authorized system-level access effectively entitles, involves an assessment of the context and nature of the data structure that is used to represent this information asset. The system level access to administrative task mappings are usually not readily available or furnished in an information system but rather must be correlated and put together from a number of different sources of such information, including but not limited to user documentation, experimental deductions, etc. Thus, the method of arriving at such a set of mappings involves data gathering, correlation and analysis, which usually involves manual human effort to put together. Once put together and made available to an access assessment method or system, this list of mappings can then be used to assess an entity's cumulative access across the information system, or a specified subset thereof.

An Illustration

As illustrated by an example, let us assume that there exists an object of class user in an enterprise directory service in an information system. Let us also assume that the object definition is comprised of a collection of a finite set of attributes, each of which exists to represent something specific about that user. Finally let us assume that a specific instance of this object represents a specific user's account in the system. Let us also assume that this specific instance of the object is protected by an authorization list which is comprised of one or more individual authorization intent specifications, which are hereby referred to as access control entries.

Let us also assume that first access control entry in that list allows some user to modify the user-account-control attribute on that user object. Notice that the authorization intent specification merely authorizes a low-level (system level) operation on an object, which is essentially a data-structure in the underlying operating system. So, in effect the permission specified in this access control entry permits the user to modify this attribute. The knowledge of the existence of this access control entry in itself is meaningless without context i.e. without also knowing what business function or administrative task the modification of that attribute corresponds to. In this example, let us assume that the designers of the underlying system so designed it such that the information contained in the user-account-control attribute governs whether or not this user account is in a disabled state i.e. temporarily out of commission.

Thus, it can be concluded that any user who is authorized modify access to that attribute on that user account object can now in effect disable the user account that this object instance represents. In addition we can also conclude that the first access control entry in the authorization list entitles its subject to disable that specific account.

Note that the partial knowledge regarding the authorization of a specific system level operation (i.e. modify in this case) on a specific securable resource, in itself, was hardly meaningful in terms of assessing access entitlements, but that the inclusion of its context in this evaluation immediately reveals the administrative task that corresponds to the system-level operation authorized by the permission specified in the authorization intent specification for that user. Without the knowledge of the associated context and the inclusion thereof in this evaluation, it most likely would not have been possible to arrive at the desired conclusion.

Continuing the discussion, in light of the above example, usually each information/IT asset is typically an instance of one of a finite number of information classes or types, as conceived by the designers of the operating system underlying the information system, and as such represents a specific type of resource. As the example illustrates, the determination of the specific administrative task or business function authorized by the presence of a specific authorization intent on an asset, involves taking into account (i) the nature of access authorized by the permission specified in the authorization intent specification, (ii) the target-specific system-level operation that corresponds to the access authorized by this permission on this specific type of the information asset, (iii) and the mapping between the target specific authorized system level operation and the administrative task the corresponds to it.

Thus, the identity of an entity can be used to determine the user's cumulative security affiliations, which in turn can then be used to determine the user's cumulative authorization intent specifications, which in turn, along with the inclusion of all pertinent aspects of the access check algorithms implemented in the underlying information/operating systems can be used to determine the user's cumulative set of authorized system-level operations, which, finally, in turn, along with along with the inclusion of the set of mappings from target-specific authorized system-level operations to corresponding entitled administrative tasks/business functions, can ultimately be used to arrive at the cumulative set of a user's cumulative entitlements across an information system, or a specified subset thereof.

In Summary

To summarize, the embodiments of this method and system involve the determination of the set of all administrative tasks that a user of a system may be entitled to, by virtue of the collective effective system-level access granted either to the user or to any security collective, such as a security group, to which the user belongs, as specified across the set of authorization intent specifications that exist in the system. In order to determine the set of all administrative tasks that a user of a system may be entitled, the method and system first determine the user's cumulative security affiliations.

With the knowledge of the user's cumulative security affiliations, the method and system proceed to assess the universe of authorization intent specifications that exist across the information system and determine the set of those existing authorization intent specifications that specify some access for either the user or one of the user's security affiliations.

With this determined set of authorization intent specifications that specify some access for either the user or one of the user's security affiliations, the method and system take into account all pertinent aspects of the access check algorithms implemented in the underlying information or operating systems and assess the user's cumulative effective system-level access specified by this set of all authorization intent specifications.

With this determined set of the user's cumulative effective system-level access, the method and system proceed to use a pre-determined or dynamically generated set of system-level access to administrative tasks mappings to finally arrive at the cumulative set of a user's cumulative entitlements across an information system.

In this manner, the method and system determine a user's cumulative access entitlements across an information system

EMBODIMENTS

In one embodiment, the invention provides a computerized method and system for determining and optionally reporting the cumulative set of all tasks that an entity, such as a user, of an information system is authorized to perform, across the information system, or a client specified subset thereof.

In another embodiment, the invention provides a computerized method and system for determining and optionally reporting the cumulative set of all tasks that all entities, such as users, in an information system are authorized to perform, across the information system, or a client specified subset thereof.

In another embodiment, the invention provides a computerized method and system for determining and optionally reporting the cumulative set of all entities, such as users, in a system that may be entitled to performing a specific administrative task in an information system, or a client specified subset thereof.

In another embodiment, the invention provides a computerized method and system for determining and optionally reporting the precise set of authorization intent specifications that exist in an information system, or a client specified subset thereof, on an information or IT asset, that in effect authorize a given entity, such as a user, or a set of entities, such as a security group, to perform a specific administrative task, or a set thereof.

In another embodiment, the invention provides a computerized method and system for determining and optionally reporting the set of all resources that an entity, such as a user, or a collective set thereof, is authorized access to across the information system, or a client specified subset thereof.

In another embodiment, the invention provides a computerized method and system for determining and optionally reporting the precise set of authorization intent specifications that exist in an information system, or a client specified subset thereof, on an information or IT asset, that in effect authorize a given entity, such as a user, or a set of entities, to perform a specific administrative task, or a set thereof, and additionally determining whether such authorization intent was in fact a part of the default (system vendor specified) entitlements conferred upon the entities, such as users, of the information system.

In another embodiment, the invention provides a computerized and system method for determining and optionally reporting the presence of excessive or insecure permissions granted to entities, such as users, on one or more specific information or IT asset across the information system, or a client specified subset thereof.

In another embodiment, the invention provides a computerized method and system for determining and optionally reporting the presence of single or multi step security privilege escalation paths that may exist across the information system, or a client specified subset thereof.

In another embodiment, the invention provides a computerized method and system for determining and optionally reporting whether or not authorization intent specifications that exist on specific information or IT asset, or a set thereof, are in compliance with the business security policy governing the protection of that specific information or IT asset or the set thereof.

In another embodiment, the invention provides a computerized method and system for determining and optionally reporting the presence of all security vulnerabilities or weaknesses that may exist as a result of the presence of what may be deemed weak or insecure authorization intent specifications on an information or IT asset in at least a portion of the information system, wherein the presence of such permissions endangers the protection of the confidentiality, integrity or availability of the asset.

In another embodiment, the invention provides a computerized method and system for providing the ability to modify the state of any assessed entitlement that the user may be entitled to across at least a portion of the information system.

In another embodiment, the invention provides a computerized method and system for assessing and optionally providing access entitlement related security risk indicators, across at least a portion of the information system.

In another embodiment, the invention provides a computerized method and system for assessing and optionally reporting time-period based differences in an entity's cumulative entitlements.

In some embodiments the invention provides the results of the determinations to the client of the system in various ways, including but not limited to, the presentation of the results in an interactive computing session, the printing of the results on any printable media, the communication of the results across a computer network to the another computing device or a client thereof etc.

In some embodiments the invention renders the information determined, to the client of the system in various ways including but not limited to summaries, time-period based reports and spotlights related to the state of access in an information system.

In some embodiments the invention presents provides time-period based (daily, weekly, etc.) reporting capabilities related to the state of access in an information system.

In some embodiments the invention presents provides cumulative access entitlement related heuristic based security indicators in an information system.

In some embodiments the invention obtains either a part of or all of the information that may be essential to making the required determination on a secure channel such that the information being obtained from a variety of sources may not be accessible by any another entity on the network In some embodiments the invention obtains either a part of or all of the information that may be essential to making the required determination with or without the employ or presence of user agents of any computing devices or hosts in the information system (i.e. agent-less discovery)

In some embodiments the invention prompts the client of the system for a set of credentials that may be required for obtaining authorized access to authorization intent specifications that exist across the information system, or a client specified sub-set thereof.

Additional aspects of the present invention will be apparent to those skilled in the art upon further consideration of this document, including the figures.

BRIEF DESCRIPTION OF DRAWINGS

FIG. 13 depicts a diagram of an overview of the cumulative entitlements assessment system which is a salient part of this invention.

FIG. 20 depicts a sample of the cumulative assessment report that this system might furnish to the client of this system.

DETAILED DESCRIPTION

Figure 1:
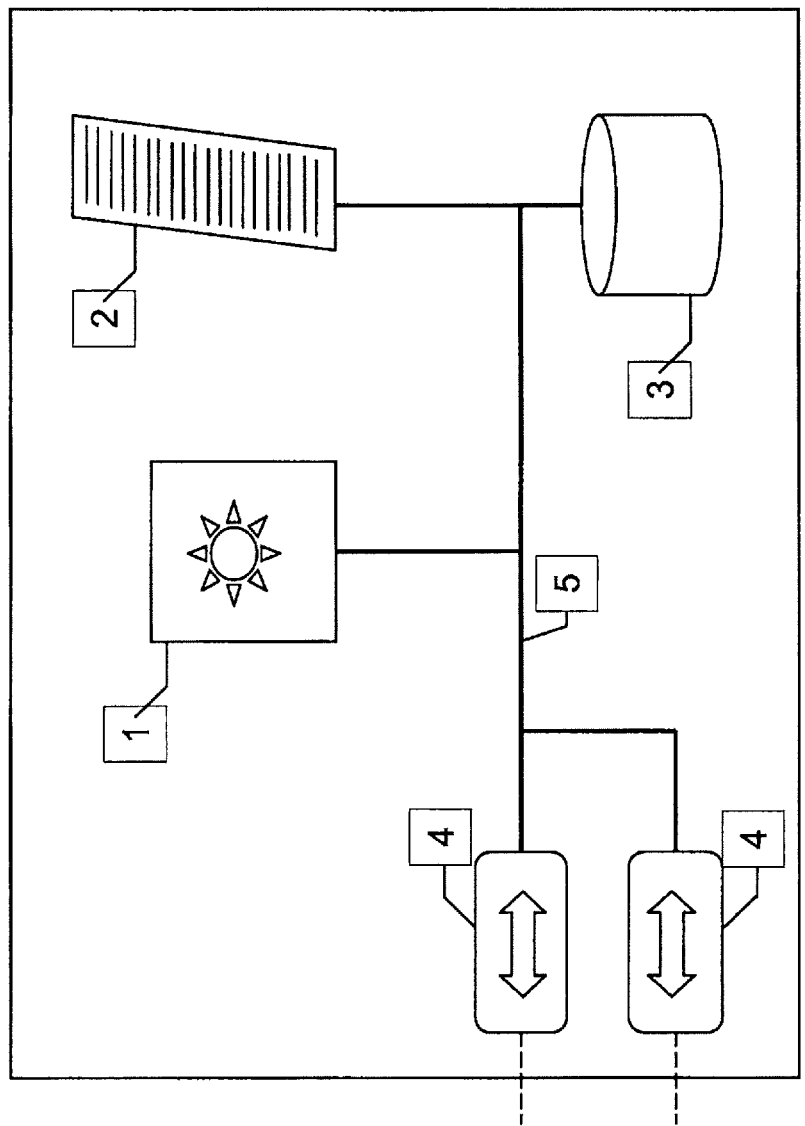
FIG. 1 depicts a pictorial representation of a computing device, a large number of which may collectively be used to develop an information system.

With reference now to the figures, FIG. 1 depicts a pictorial representation of a computing device, a large number of which may collectively be used to develop an information system. As is illustrated in the figure, every computing device may be considered to be comprised of at least five main (and possibly more) technical components including a single or multiple processor 1, volatile system memory 2, involatile storage memory 3 and a host of input/output interfaces and/or controllers 4, all connected together by a system bus 5, which may further be connected to various input and output devices, the most common ones being keyboards, mice and monitors. The description of a computing device as presented herein is primarily intended to communicate a nature of a computing device.

In additional reference to computing devices, most of these computing devices will usually be controlled by some sort of a control program such as an operating system. The operating system runs on the processor and utilizes and manages other hardware components of the host. The operating system provide multiple layers of abstraction between the hardware and the users of a system and as such provides numerous capabilities and facilities to coordinate, control and manage the various components and activities on the host. The operating system may be one developed and offered by a commercial vendor, such as the Windows family of operating systems offered by Microsoft Corporation, or the Mac OS offered by Apple Corporation, and/or it may be one that developed and offered by a joint public effort, such as the various flavors of the Linux operating system. The list of operating systems mentioned above are merely intended as examples and are not an architectural limitation for the present invention.

At least one of the capabilities usually made available by the operating system on the computing device would allow for the ability to protect the computing device itself and further usually allow for the ability to protect any information assets created, consumed, stored or communicated from the computing device. These set of security capabilities available on this computing devices may usually further be augmented by one or more security services offered on other computing devices and made available for use on this computing device.

Figure 2:
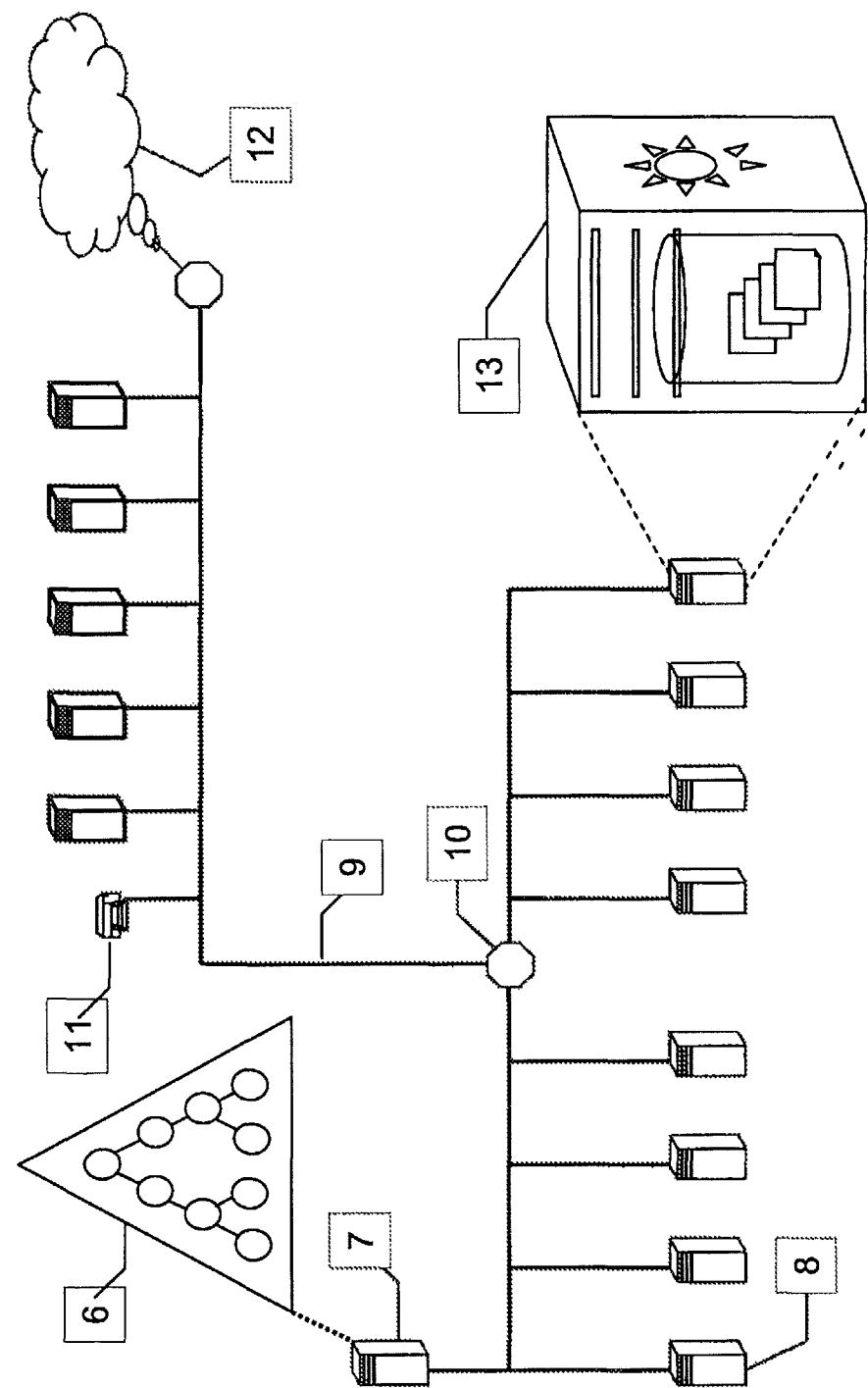
FIG. 2 depicts a pictorial representation of an information system in which the present invention may be implemented.

FIG. 2 depicts a pictorial representation of an information system in which the present invention may be implemented.

Information System

As is illustrated in the figure, an information system consists of one or more computing devices 8, each one usually running an operating system, and thus commonly referred to as hosts 13, each of which may play one or more roles including that of a client or a server. Servers 7 may host a variety of services 6 including but not limited to resource location services, name translation services, data storage and retrieval services, directory services and a set of security services.

These computing devices may or may not be connected via a communications network 9.

In reference to the communications network that may connect these computing devices, the communications network may be a Local Area Network (LAN), or a Wide Area Network (WAN) or a combination thereof, and the underlying set of communications protocols may belong to the universally known TCP/IP set of protocols or another set of communications protocols that in effect facilitate the communication of data across a network. Such a communications network may in fact also provide connectivity to the Internet 12, and additionally securely use the Internet to extend the information system across various geographically disconnected parts of the world. The computer network displayed in this picture is primarily intended as an example.

In reference to IT assets, an IT asset may be any asset that enables or facilitates the use of computing towards providing a useful function to the needs of an individual or an organization. In line with this description, computing devices including portable and non-portable personal computers 13, servers 7, personal digital assistants, portable and non-portable media devices, communications networks 9, operating systems, information security systems and their components including user accounts, group memberships etc., and a host of other components such as printers 11, scanners, various kinds of networking equipment such as routers 10 and other similar assets together represent the set of IT assets of an organization.

In reference to information assets, information in any form that is of some value to an organization or an individual constitutes an information asset. As an example, an information asset may be anything that (i) is of some value to an entity, such as a user, or a set thereof, and (ii) exists in a form may be created by and/or consumed by an entity such as a user, using a computing device (with or without an operating system) and optionally further communicated between two computing devices and/or be stored and/or be storable on a computing device, and (iii) exists as a collection of data units that a computing device can understand and process such that (iv) the application of computing processing applied to this collection of data units on a computing device, reveals the information that is embodied in the collection of data units.

Thus, any information stored in data units such as data files of various types, or in databases, or in any other commonly used units of data, and optionally any information communicated between two parties via the use of one or more computing devices would constitute an information asset. Examples of such information assets include, but are not limited to intellectual property, trade secrets, product blue-prints, business plans, competitive strategies, business intelligence, strategic and tactical plans, financials, customers records, employee records, operational and security blue-prints, information exchange between employees, customers, executives & other stakeholders etc. In most information systems, information assets are stored as files or databases on the numerous hosts 13 that comprise the information system.

In reference to the users of an information system, every information system has a set of users that use IT assets that the information system is comprised of towards the fulfillment of some purpose, and in the course of doing so, create, consume, communicate and store information assets. An information system could have a single user or a number of users, and this number could be small, medium or large.

Figure 3:
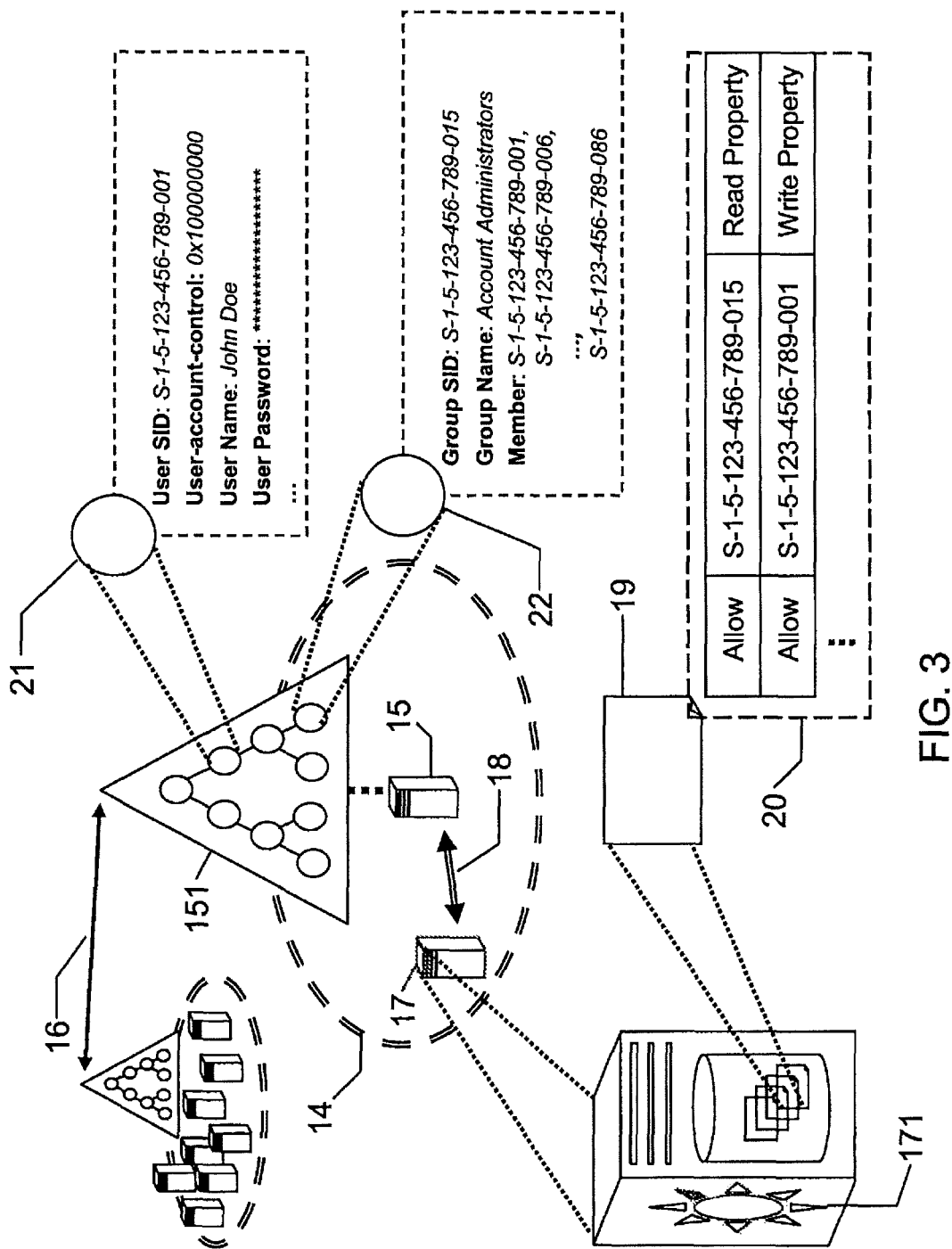
FIG. 3 depicts a diagram illustrating the authentication and authorization components of the underlying security subsystem that together provides the means to secure information and IT assets in an information system.

FIG. 3 depicts a diagram illustrating the authentication and authorization components of an underlying security subsystem that provides the means to secure information and IT assets in an information system.

Information Security

In reference to the need for information security in an information system, by its very nature, the term asset refers to something that is of value to someone, and thus, implicit with its nature and a function of its value to its owner or owners, is a need to protect either one of or a combination thereof of the confidentiality, integrity or availability of the asset.

The protection of an information asset or an IT asset generally involves the ability of the owner or owners of the information asset to specify the type of access that another entity may have on that asset, and this usually corresponds to specifying the set of actions that another entity, such as a user, could perform on an information asset. This aspect of information security is commonly referred to as authorization. Therefore it is usually preferable to unambiguously differentiate between two or more different entities and uniquely identify each one of them. This aspect of information security is commonly referred to as identification.

The mere ability to uniquely identify an entity is insufficient without the means to irrefutably confirm that an entity is indeed who he or she claims to be. Thus in addition to being able to uniquely identify an entity, the means by which a claim to an identity may be corroborated are required. The aspect of information security that enables this means, is commonly referred to as authentication and it involves providing the means for and subsequently verifying without a doubt the validity of an entity's claim to an identity.

Finally, there exists one other aspect of information security, which while isn't technically fundamental, is treated as such, and is commonly referred to as auditing; it provides the means to create and obtain a record of the actions taken by an entity. Thus, in order to adequately protect information or IT assets, the two main fundamental abilities, that of authentication and authorization, and optionally the third, that of auditing preferably are available in an information system. In most information systems, these abilities are delivered by the underlying distributed operating system, which is usually comprised of a set of individual operating systems running on the numerous computing devices in the information system, all working in tandem to deliver a set of distributed services that allow for the adequate protection of all information and IT assets across the information system.

A computing device running an operating system is from hereon referred to as a host, as is illustrated by 17 in this figure.

Security Domains

Almost all information security systems today have the notion of a security domain 14 and associated with each security domain is a security authority 15 that is responsible for providing the means to protect all information and IT assets that are a part of that security domain. As mentioned earlier, the means to protect assets involve two main fundamental abilities, that of authentication and authorization. Authentication requires the use of user accounts and authorization requires the use of some means by which authorization intent can be specified towards the protection of information and IT assets, also commonly referred to as securable resources. Authorization intent is almost always specified in terms of the type of access granted to a user or a set thereof on a specific securable resource or a set thereof.

The domain security authority is thus responsible for issuing user accounts to the users of the system (domain) for the purpose of authentication. Domains require an account store to store domain user accounts and their credentials. Most commercially available operating systems use an enterprise directory 151 as their account store. All users of a domain thus have a user account issued by the domain's security authority that represents them uniquely and that they use to authenticate to the system. User accounts are typically stored in an account database such as an enterprise directory service 151 as a user account 21.

Domain Joined Hosts

As mentioned above, a domain security authority is responsible for providing the means to protect all information and IT assets that are a part of that security domain. An IT or information asset can be a part of a security domain either by virtue of being created, consumed, communicated or stored on or via a host 17 that is a part of that security domain and/or by being under the direct or indirect control of a user that belongs to that security domain.

The notion of a host 17 being a part of a domain 14 needs some elucidation. By itself, a domain is merely a concept and strictly speaking, by itself only includes the trusted authority 15 for that domain. In addition to the presence of a central trusted authority, each stand-alone host such as 17 has a local trusted authority 171, also referred to as a local security authority, which is responsible for protecting all securable information assets on that host and further optionally responsible for protecting (to the extent that it can) the host itself.

This local security authority 171 on the host can also issue local accounts for use on the host itself and as such is authoritative for all local accounts on that host, and the boundary of the local security and its local accounts is the host and only that host, and thus includes every securable resource on that host, each of which may exist in various forms, such as, but not limited to, information contained in a variety of files and databases etc.

Every such host that has a local security authority can join the domain. The purpose of joining the domain is primarily to allow domain accounts access to any local securable resources on this host. The act of joining the domain involves the establishment of a computer account in the domain trusted authority's account store for that host (which is similar to a user account) and the establishment of a shared set of secrets (similar to a password) between the local security authority and the domain security authority. This set of secrets is then used to establish a secure channel 18 and communicate securely.

The act of joining the domain results in the extension of the domain in that it now enables entities with domain user accounts to access resource stored on the domain joined host. Under the hood, an implicit trust relationship is established between the domain security authority and the hosts' local security authority and as a result, the local security authority agrees to accept all vouches by the domain security authority in regards to the validity of a domain account. Because of the presence of this implicit trust, the local security authority allows any domain user to access the host either interactively or across the network and access resources on the host, subject obviously to the individual access control specifications protecting these resources. In this manner, a large number of hosts may join a domain and the set of all machines joined to the domain in effect identities the bounds of the domain. A domain user account can thus be authenticated by the domain and access resources on any host that is joined to that domain.

Trust Relationships

Note that in order for an information system to be able to scale and interoperate with other information systems, there needs to be a way to integrate two or more independent security domains. The means by which two or more independent security domains integrate to extend the information system involves the establishment and use of trust relationships 16.

A trust relationship 16 establishes a trust between the security authorities for each of the security domains and this trust essentially represents a contract between the two security authorities whereby the security authority in the trusting domain agrees to accept a vouch by the security authority in the trusted domain for the validity of an authenticated user account from the trusted security domain. From this point on, a user (account) from the trusted domain can access resources in the trusting domain subject to any access control checks in place on resources (i.e. IT and information assets) in the trusting domain, just as though a user from the trusting domain itself could access these resources. In this manner, a set of security domains can be connected to meet the needs of even very large information systems.

Authentication

Authentication also requires the ability to uniquely identify entities. In most systems, there generally exists a notion of a security identifier (commonly referred to as a SID in some systems) that serves to uniquely identify a user account in the system. It may be noted that in addition to users, even hosts 17 and/or services running on these hosts could have a unique local or domain identity and thus could have a local or domain user account which may be used to authenticate to the domain. Also, as noted above, if there exists a trust relationship between two domains, then users with accounts in the trusted domain may access resources hosted in the trusting domain just like they would access resources stored on hosts that belong to their own domain.

In most systems, SIDs are used to specify the entity to which access is being granted in an authorization intent specification that protects information or an IT asset. Thus, every entity that has a user account in the system is uniquely identified by a SID. There also exists one other type of entity with which a SID is associated—that entity is that of a security collective, most commonly implemented as a security group. A security collective, such as a security group, is used to specify authorization intent for a collection of users. Security groups can either belong to a domain or to a host. Domain security groups are typically stored in the enterprise directory service and local security groups are usually stored in the local security database. Each security collective, referred to from hereon as a security group for convenience also has a unique SID associated with it. As such, any entity that has a SID associated with it is commonly referred to as a security principal.

Authentication almost always involves the presence of a shared secret between a user and the trusted authority, and the process of authentication involves the user somehow proving to the trusted authority that issued the account and as such is authoritative for it, that he or she or it is in the know of the shared secret. The means by which a user may authenticate to the trusted authority can vary and typically involve providing proof of possession of a shared secret, via one or more factors of authentication, such as the use of a password, or a physical possession from which a secret can be independently inferred, or the use of some aspect of the human body which could be used to uniquely identify the user to the system.

Authorization

Once a user is authenticated by the trust authority, he or she may proceed to access IT and information assets that belong to the security domain subject to individual, and optionally, collective access control (i.e. authorization) intents individually protecting these IT and information assets. Access control or authorization works in most security systems works as described below.

Each information and IT asset is represented in the underlying operating system as a securable resource 19, in that the system provides the means by which the resource can be protected. There typically exists a resource manager in the operating system that is, amongst other things, responsible for ensuring authorized access to all securable resources. In most systems, each securable resource is protected by some sort of an individual authorization list 20, which is typically attached to the resource or in other cases, indirectly governs the access to that securable resource. Each such authorization list is typically comprised of a set of authorization entries which are usually considered the unit of authorization intent specification in the system. Each individual authorization entry within the authorization list specifies the nature of authorized (or for that matter unauthorized) access for a specific security principal in the system. Authorization lists are commonly referred to as access control lists (ACLs) and the individual authorization entries that comprise an ACL are commonly referred to simply as access control entries (ACEs).

A user account may be added to any number of security groups 22 for the purposes of enabling the specification of access control for a collective of users. Thus a user account may belong to one or more security groups and ACEs in ACLs of securable resources in a system may specify authorization intent for security principals, which include user accounts and security groups.

After a user is successfully authenticated by the domain security authority 15 or local security authority 171, in most implementations, the system proceeds to create what is commonly referred to as an access token for the user. An access token is merely a collection of the user's SID and the SIDs of any and all groups to which the user belongs. In certain implementations, there may exist different types of groups, each of which may have certain system-defined constraints in regards to their use. Additionally, in certain implementations, not all of a user's groups may always be added to a user's access token. The determination of which groups to add to a user's access token is usually governed by a well-defined and implemented token generation algorithm which may take into account multiple factors when deciding whether or not to add the SID of a specific group to the user's access token. It may also be noted that the description of the generation of the access token is highly simplified here and in reality may be more complex and implementation dependent.

It may further be noted that in addition to SIDs, in some implementations, additional authorization elements may be added to a user's access token. In certain systems, these additional authorization elements represent certain system wide authorization grants commonly referred to as user rights and/or privileges. These special types of permissions govern the access granted to a set of resources, larger than individual resources, an entire computing device being an example of such a large resource.

In most systems, the act of engaging in computing involves the establishment of a logon session on a host. A user may thus log on interactively or via the network on to a system and a user always logs on interactively to at least one host, and may further by logged on across the network to other hosts. The act of logging on first and foremost involves authenticating the user and subsequently the establishment of a logon session. It may also be noted that a user always logs on to a host and it is the local security authority on that host that us responsible for authenticating the user and upon successful authentication establishing a logon session for that user.

A user may logon to a host by using his/her local account or by using his/her domain account. If the local account is used, the process is usually referred to as logging on to the host and if the domain account is used, the process is usually referred to as logging on to the domain. During a local logon, because a local account is used, the local security authority 171 itself authenticates the user and upon successful authentication proceeds to build an access token for the user. In this case, the access token would include the SIDs of all local groups to which that local user account belongs on that host.

During a domain logon, because a domain account is used, the local security authority 171 forwards the authentication request to the domain security authority 15 which then proceeds to authenticate the user and upon successful authentication proceeds to build a packet that contains a list of all domain groups that user belongs to transitively and finally sends this set of groups back to the local authority. The local authority then proceeds to generate the access token which consists of the user's SID plus the transitive list of the user's domain group memberships plus the transitive list of any local groups to which the user or one of his domain group SIDs might belong. As mentioned earlier, the local security authority may also proceed to add any other system-wide entitlements commonly represented by user-rights or privileges to the access token. It may also be noted that the description of the generation of the access token is highly simplified here and in reality may be more complex and implementation dependent. The access token is then successfully generated and attached to a logon session. This logon session uniquely represents the computing session of the logged on user on that host.

Once a logon session is established for the user, every action that occurs for the user on the host happens in the context of a process, which in most operating systems is a unit of overall execution. Strictly speaking, there exists the notion of threads which may be considered as the real unit of execution, but every thread belongs to a parent process without which it cannot exist and from that perspective, a process can be treated as a unit of overall execution. Note that there may exist multiple processes running on a system for that user. Attached to each process is the access token for that user.

Every action thus happens in the in the context of a process attached to which is the user's access token. Any action that involves accessing a securable resource is subject to an access check that takes into account the user's access token and the securable resource's access control list. The access check determines whether or access is granted, and if so, the action is allowed to proceed. In this manner authorization protects all securable resources in an information system.

Figure 4:
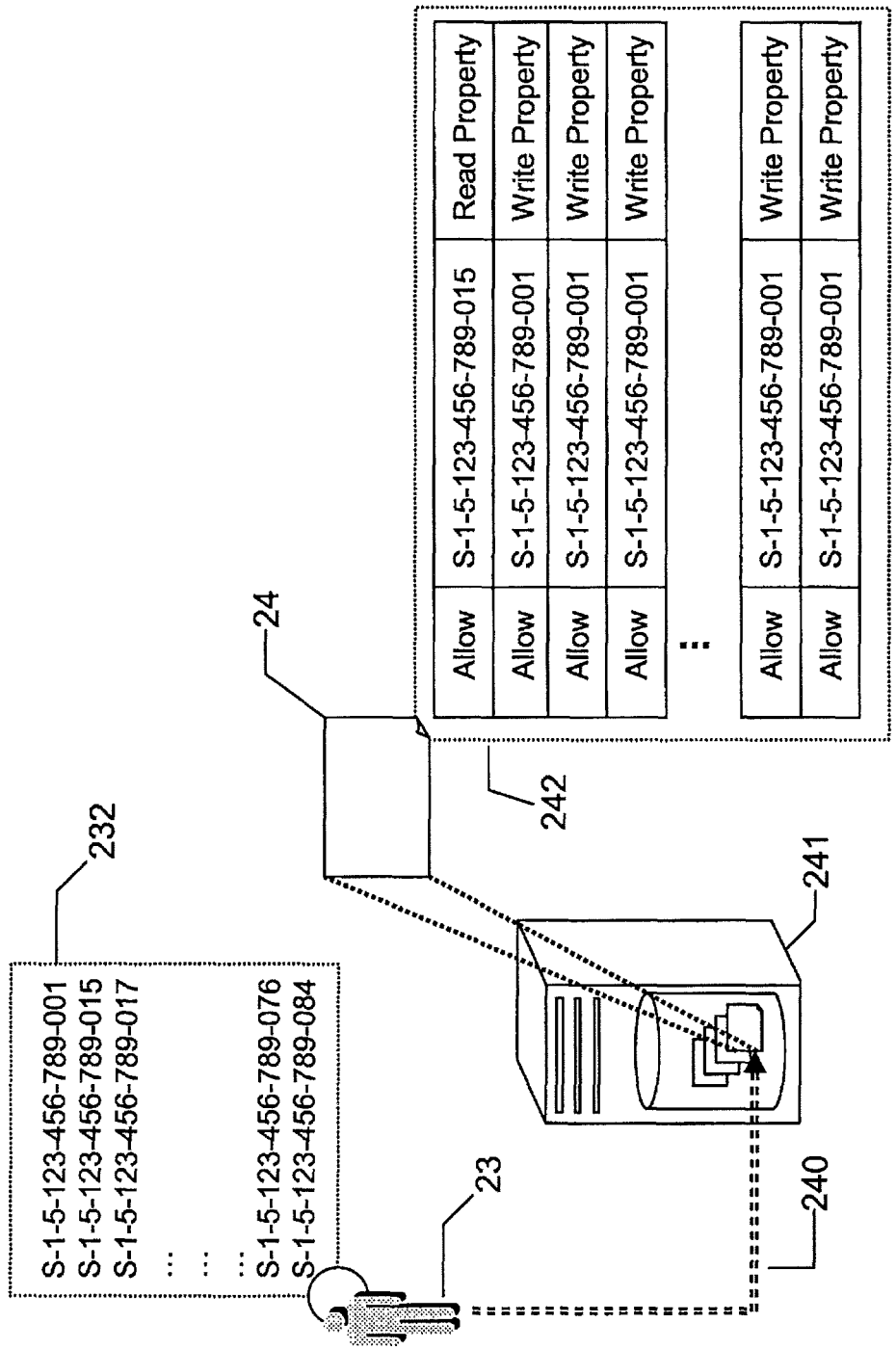
FIG. 4 depicts a diagram illustrating the components of an access check.

FIG. 4 depicts a diagram illustrating the components of an access check. Any action that involves accessing a securable resource is subject to an access check. As illustrated in the figure, a user 23 attempts 240 to access a securable resource 24 that is stored on a host 241. The act of accessing a securable resource is always performed on the behalf of the user by a process and as such always involves an access check. The access check determines whether or not the access that is being attempted or requested is in fact authorized.

The access check thus takes into account the set of authorization intents protecting the securable resource. As mentioned previously, a securable resource is protected by an ACL 242. In strict technical parlance, the ACL may additionally belong to a data structure commonly known as a security descriptor (SD). A security descriptor usually consists of the ACL of the object, and usually also contains object ownership information and audit intent. Also, as mentioned previously, an ACL contains a list of ACEs each of which specifies a specific permission for a security principal, the identity of which is specified in the form of SIDs.

Thus, in order for an access check to validate whether or not a user attempting access to a securable resource is in fact authorized such access, it should further take into account the SID of the user him/herself and list of all group SIDs to which the user might belong. Note that a group to which the user belongs may further be a part of another group. The access token generation process ensures that all such SIDs are added to the access token 232.

Thus, two components come into play during an access check—the ACEs in the ACL 242 of the securable resource to which the user is requesting access and the access token 232 of the user. The ACEs in the ACL define the entirety of permissions that are authorized for various users and groups in the system and the user's access token contains and denotes the users SID and the set of all group SIDs to which the user may belong directly or transitively.

The specifics of the access check are a function of its implementation which is turn is a function of the underlying operating system upon which the information system is running. The following is a description of how the access check takes in place in the world's most dominant set of operating systems, Microsoft Corporation's Windows family of operating systems. As such most other commercial and publicly developed operating systems deploy a similar approach in their access check mechanisms. It may also be noted that this description of the access check is primarily intended to illustrate the concept thereof.

In Windows, when a thread that belongs to a process that is operating on behalf of the user tries to access a securable object, an access check determines whether or not the requested access should be allowed. This access check takes into account the ACL on the securable object and the access token of the user. If the object does not have an ACL, the system grants access; otherwise, the system looks for ACEs in the object's ACL that apply to the thread. Each ACE in the object's ACL specifies the permissions that are allowed or denied for a security principal. The system compares the SID (denoting a security principal) listed in each ACE to the SIDs that are present in the thread's access token.

The system examines each ACE in sequence until one of the following events occurs: (i) an access-denied ACE explicitly denies any of the requested access rights to one of the trustees listed in the thread's access token, or (ii) one or more access-allowed ACEs for trustees listed in the thread's access token explicitly grant all the requested access rights, or (iii) all ACEs have been checked and there is still at least one requested access right that has not been explicitly allowed, in which case, access is implicitly denied. If it is found that there exists an access-denied ACE that explicitly denies any of the requested access rights to one of the trustees listed in the thread's access token, then access is denied. If there exist one or more access-allowed ACEs for trustees listed in the thread's access token that explicitly grant all the requested access rights, then access is allowed If all ACEs in the ACL have been checked and there is still at least one requested access right that has not been explicitly allowed, then access is implicitly denied.

In this manner, the access check and the various components of authorization together work to protect securable resources and implement authorization in a Windows operating system based information system.

Figure 5:
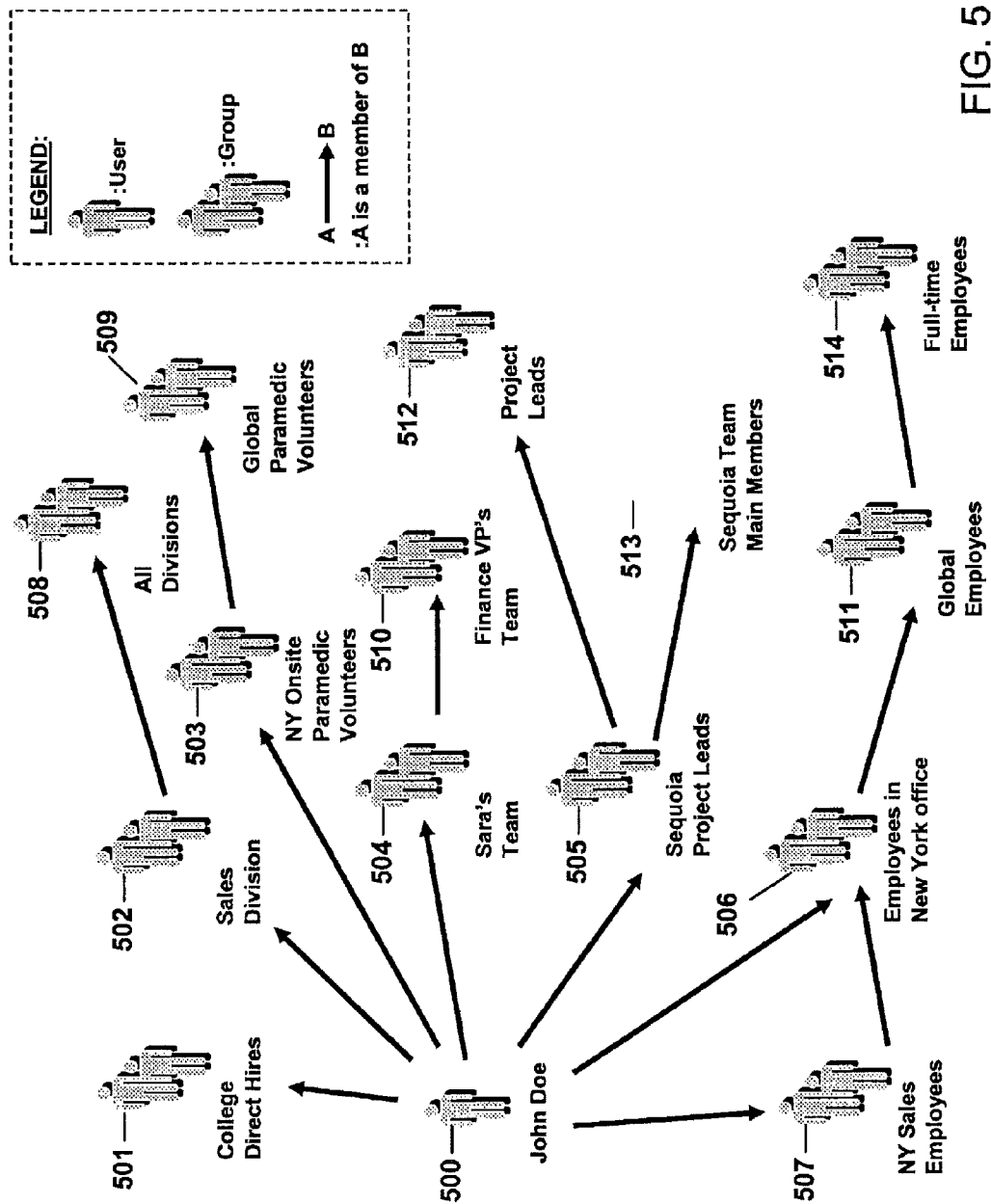
FIG. 5 depicts a user and his cumulative security affiliations.

FIG. 5 depicts a user and his cumulative security affiliations.

Security collectives are used to simplify the specification of authorization intent for a collection of users and simplify the management of access control in an information system. They are also used to group a collection of users together for a variety of other secondary purposes, such as having a specific set of security policies apply to a specific set of users.

In most systems, the notion of a security group is used to represent security collectives and to facilitate the means by which users can be aggregated for the purposes of specifying authorization intent to a collective. In some operating systems that offer roles-based access control, security collectives take the form of administrative roles and the administrators of the system provision access based on administrative roles. In such a system, users are typically assigned to various roles, each of which may be granted some access somewhere in the system. It is clearly evident that a user's security collectives, also referred to as his or her affiliations, play a vital role in the set of entitlements that he or she may have across the information system.

In this figure, we see an example of a user and his security affiliations. John Doe is an employee of an organization. He is employed at the organization's New York office and works in the Sales division of the company. As the diagram depicts, he is a member of numerous security groups across the organization, each of which is owned by some asset owner or group. Each of these security groups serves to aggregate users for the purposes of specifying authorization intent and as such these groups are used to provision access to various resources across the organization's information system.

It is evident from the illustration that John Doe's user account 500 is a direct member of seven groups 501, 502, 503, 504, 505, 506 and 507. Note that a simple inspection of the user's account will reveal that John Doe is only a member of seven groups. However, as we can see, each of these seven groups in turn is a member of numerous other groups. In fact, closer inspection reveals that John Doe is transitively a member of fourteen security groups. This fact would not be evident upon the inspection of John Doe's account itself, or upon the isolated inspection of any group to which he belongs. Notice that in some cases, John is member of a group which in turn is a member of yet another group, which in turn is a member of still yet another group.

From an access control perspective, ultimately, John is a member of all these groups and thus is cumulatively granted the entirety of all permissions that may exist anywhere in the system for any one these fourteen groups. In effect, John is entitled to performing the set of all administrative tasks that are cumulatively authorized by the presence of the entire set of permissions that exist across the information system for all these fourteen groups.

For example, if on some host in the Chicago office, there exists a file folder to which someone has granted the Global Employees security group write access, that one single permission will allow John to create files and folders in that existing file folder. On a similar note, if in the enterprise directory service, someone has granted the Sequoia Team Main Members security group the ability to create user accounts or create additional security groups, then in effect, John will be entitled to creating new users and security groups in the system. Note that none of these permissions were directly granted for John, but in fact were granted for a security group of which John is a member transitively i.e. John happens to be a member of that group by virtue of an intermediate security group of which he is a member and which is a member of that group to which access is granted on that resource.

It will be instantly apparent to those of ordinary skill in the art that the use of security affiliations in access control while having its advantages, also has its disadvantages in that it makes the task of assessing the cumulative set of a user's entitlements complex and non-trivial. It is also clearly evident that any attempt to accurately assess the cumulative set of a user's entitlements must take into account the cumulative set of a user's affiliations. On a related note, it is also evident that for an access check to accurately protect a securable resource, it must take into account the cumulative set of a user's affiliations. It is thus important to understand how an operating system takes the cumulative set of a user's affiliations into account.

As mentioned earlier, in most operating systems, upon which information systems are founded, the notion of a security group comes closest to that of a security collective. So here we examine the nature and the various types of security groups, where they are stored and how they end up in an access token of a user. As also mentioned earlier, there are two common types of security authorities—a domain security authority which is authoritative for all user accounts in a domain, and a local security which is authoritative for all local user accounts on a host. Similar to user accounts, security groups also belong to one of the two authorities, i.e. the domain security authority or the local security authority. Thus there exist two primary types of groups—domain groups and local groups. Domain groups can typically contain as members any user account from the domain. Local groups can typically contain as members any local user accounts, and if the machine is a part of a domain, any user accounts from the domain.

When a user is authenticated, an access token is generated for him by the local security authority. If the user being authenticated is using a local user account, then the local security authority determines the set of all local groups to which the user may belong directly and transitively and adds this SIDs representing this entire set of groups to the user's access token.

If the user being authenticated is using a domain user account, then the domain security authority determines the set of all domain groups to which the user may belong directly and transitively and packages this SIDs representing this entire set of domain groups to the which the user's belongs and sends it back to the local authority of the computer at which the user is attempting a logon from. The local security authority then proceeds to determine the set of all local groups to which the user (and any domain groups to which he belongs) may belong directly and transitively and in this evaluation takes into account the list it received from the domain security authority. After this determination is done, it adds to the list of SIDs received, the SIDs of any local groups to which the user might belong, and inserts this cumulative list of SIDs to the access token of the user.

It may be noted that the manner described above, in which an access token is generated, is representative of most operating systems today, and in fact is a fair representation of how access token generation works in Microsoft's Windows family of operating systems. It may further be noted that in the interest of brevity, details known to those of ordinary skill are left out for clarity. It may further be noted that description of the access token is generation process is primarily intended to illustrate how security affiliations come into play during an access check.

Figure 6:
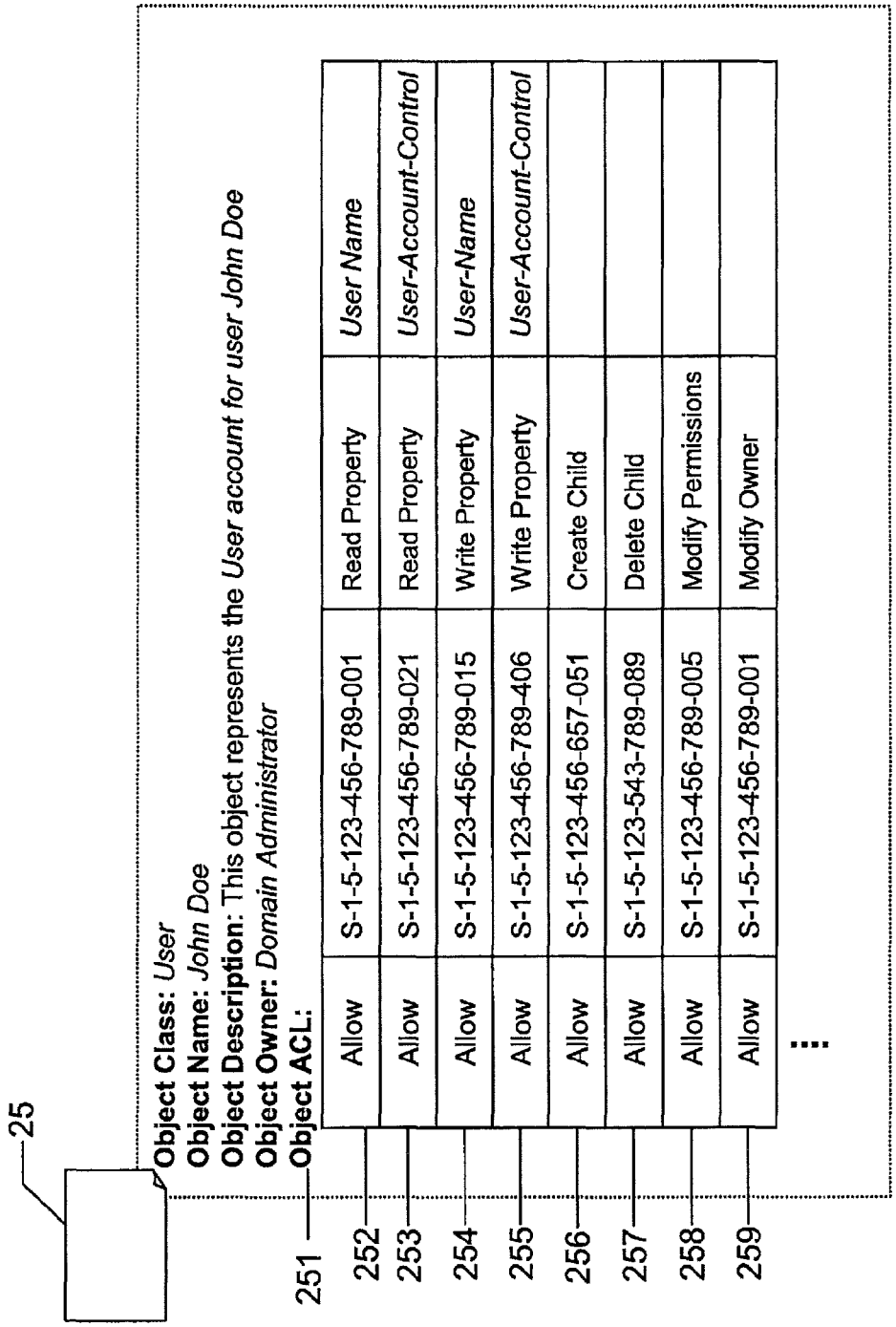
FIG. 6 depicts information/IT asset and the authorization list that protects the asset.

FIG. 6 depicts information/IT asset and the authorization list that protects the asset.

Information and IT assets manifest themselves as securable resources that are afforded protection by the various security controls that are delivered by the operating system that underlies an information system. As mentioned earlier, securable resources are protected by authorization lists, more commonly referred to as access control lists (ACLs). An access control list consist of a set of zero or more access control entries (ACEs) each of which individually specifies a specific type of access for a specific security principal (i.e. user or group).

In this figure, we see an example of an IT asset and the authorization list that serves to protect it. The IT asset depicted in the example is a user account for the user John Doe. As is evident, this IT asset is represented by a common operating system data-structure referred to as an object and is manifested in the system as an instance of an object of type user in the organization's directory service.

We also observe that this securable object is protected by an access control list (ACL) 251, which is comprised of a set of individual access control entries (ACEs) each of which specifies a set of permissions for some security principal.

In particular, we observe that:

The first ACE 252 allows the security principal S-1-5-123-456-789-001 Read Property access to the User Name attribute on this object. This ACE thus grants the user or group represented by this SID the ability to read the value of the User Name attribute on this user object.

The second ACE 253 allows the security principal S-1-5-123-456-789-021 Read Property access to the User Account Control attribute on this object. This ACE thus grants the user or group represented by this SID the ability to read the value of the User Account Control attribute on this user object.

The third ACE 254 allows the security principal S-1-5-123-456-789-015 Write Property access to the User Name attribute on this object. This ACE thus grants the user or group represented by this SID the ability to modify the value of the User Name attribute on this user object.

The fourth ACE 255 allows the security principal S-1-5-123-456-789-406 Write Property access to the User Account Control attribute on this object. This ACE thus grants the user or group represented by this SID the ability to modify the value of the User Account Control attribute on this user object.

The fifth ACE 256 allows the security principal S-1-5-123-456-657-051 Create Child access to the User Name attribute on this object. This ACE thus grants the user or group represented by this SID the ability to create new objects under this object in the directory store hierarchy.

The sixth ACE 257 allows the security principal S-1-5-123-456-789-089 Delete Child access on this object. This ACE thus grants the user or group represented by this SID the ability to delete any existing objects under this object in the directory store hierarchy.

The seventh ACE 258 allows the security principal S-1-5-123-456-789-005 Modify Permissions access on this object. This ACE thus grants the user or group represented by this SID the ability to modify the permissions associated with this object.

The eighth ACE 259 allows the security principal S-1-5-123-456-789-001 Modify Owner on this object. This ACE thus grants the user or group represented by this SID the ability to modify the owner of this object.

Each ACE thus specifies authorization intent for a specific security principal. In particular, the ACE specifies the precise type of low-level permission that the security principal is authorized to perform. Strictly speaking, an ACE can also specify the precise type of low-level permission that the security principal is explicitly prohibited from performing on that object. An ACE can thus be one of two main types—an ALLOW ace or a DENY ace. An ALLOW ace is used to specify a permission that the user is allowed to perform. A DENY ace is used to specify a permission that the user is prohibited from performing.

It should be noted that in most implementations objects in an operating system are organized in the form of a hierarchical structure. Thus each object has at least one parent in the hierarchy and each object may have zero or more child objects. It should be further noted that most commercial implementations allow for an ACE to be marked as inheritable. This capability allows the specification of authorization intent at a single point in the hierarchy and has the effect of having specified the authorization intent on an entire sub-tree of objects or a subset thereof. To enable this capability, an ACE can be marked as inheritable. If an ACE is marked as inheritable, the system automatically ensures that a copy of the ACE is added to the ACL of every object in the sub-tree rooted at the object at which the ACE was applied. An ACE thus contains certain flags that are used to indicate whether or not an ACE may be inheritable and that are also used to determine whether or not an inherited ACE may be an effective ACE on an object.

An ACE is considered to be effective only if authorization intent specified by an ACE is taken into account during an access check. An ACE can be ineffective if it shows up in the ACL solely as a consequence of the fact that it was marked inheritable on a parent object and meant to be inherited down to all objects in the sub-tree rooted at the object where the original ACE was specified. In particular, certain implementations also allow for the specification of specific object classes in ACEs, in that the authorization intent specified by an ACE would only be taken into account during an access check, if the object on which the ACE exists is of the same class as was specified in the ACE. In consideration of this fact, an ACE that is specified to be applicable on only a specified class of objects in only considered effective on objects of that class, and thus is considered to be ineffective on all objects that are not instantiations of the specified class. The generally accepted norm is that unless required, object class types are not specified and thus most ACEs by default are applicable and thus effective on objects of all classes.

This fact is of particular relevance to this invention because while there may exist multiple ACEs in a securable objects DACL, not all of them may be taken into account during an access-check. Only those ACEs that are considered effective on the object are taken into account. This fact is of relevance to the invention because the logic implemented in the method and the system to determine the cumulative set of a user's authorization entitlements must only take into account the set of all effective authorization entitlements and it must take all such effective authorization entitlements into account.

Also, in general, most implementations allow for the specification of the following low-level permissions:

Read-ACL: The permission to read the ACL protecting the object

List-Child: The permission to view any child objects of an object in the hierarchy Read-Property: The permission to read the properties of the object. It may be noted that it is the values of the properties that as a whole make the object meaningful.

Write-Property: The permission to modify the values of the properties of the object. It may be noted that it is the values of the properties that as a whole make the object meaningful.

Create-Child: The permission to create child objects. This is how the system controls the ability of a user to add an object to the system.

Delete-Child: The permission to delete child objects. This is how the system controls the ability of a user to add an object to the system.

Modify-Owner: The permission to modify the ownership of the object. By design, every object has an owner and the owner by virtue of ownership has full-control over the object. Full-control implies all permissions.

Modify-Permissions: The permission to modify the Security Descriptor protecting the object. It may be noted that the ACL is a part of an object's security descriptor.

Extended-Rights: In addition to the standard permissions mentioned above, the system may require the presence of certain specific permissions governing the ability to perform a specific and usually critical task. All such special permissions fall under the umbrella of extended-rights.

In addition, for some specific types of IT assets for which it may not be meaningful to specify access control in a simple authorization list, there may exist other elements that can sufficiently provide the means to specify authorization intent required for the adequate protection of such an IT asset.

Figure 7:
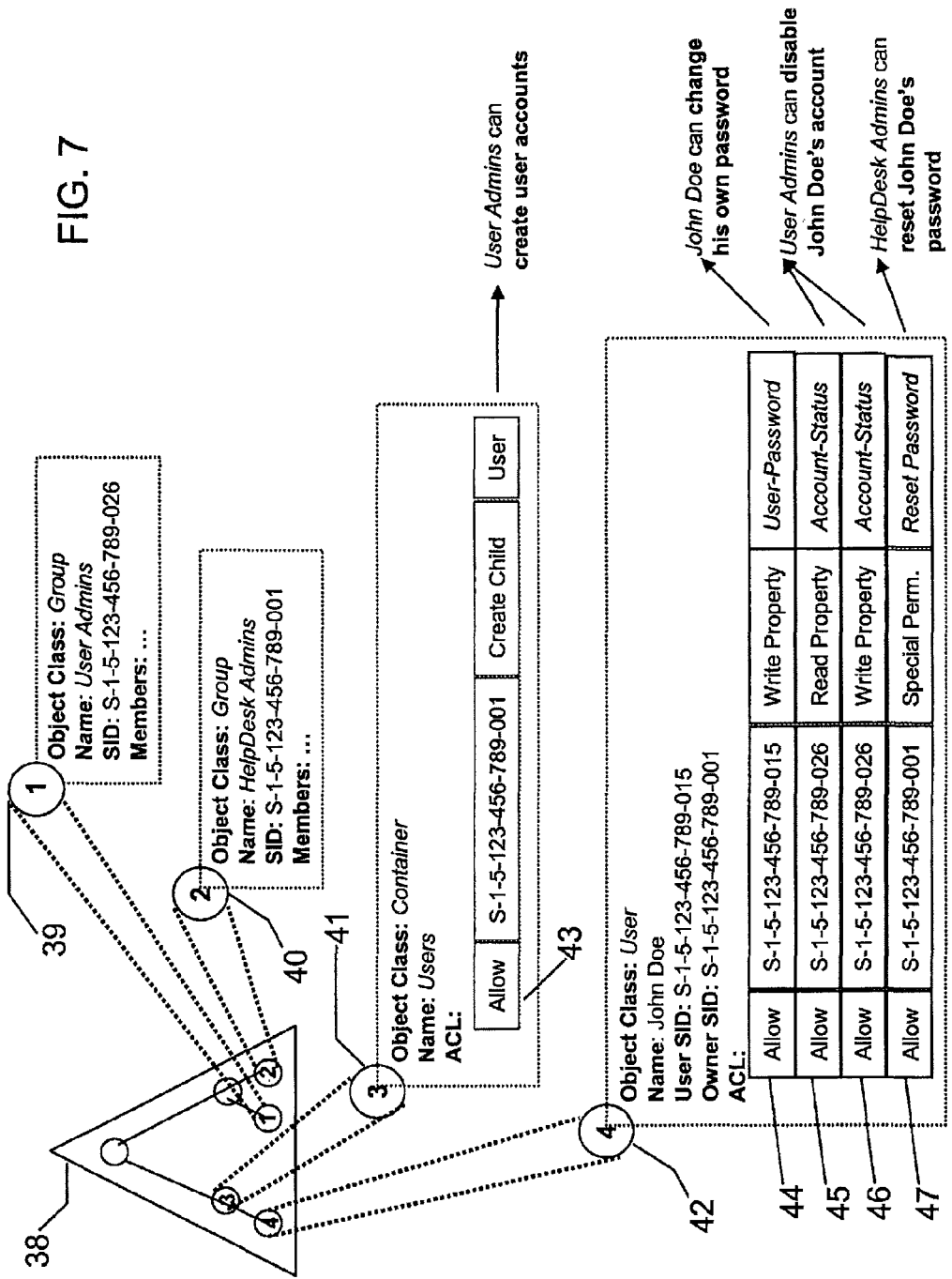
FIG. 7 depicts a diagram illustrating the relationship between an administrative task/business function and the corresponding system-level permission that authorizes the administrative task/business function.

FIG. 7 depicts a diagram illustrating the relationship between an administrative task/business function and the corresponding system-level permission that authorizes the administrative task/business function.

Note: The words "low-level" and "system-level" may be interchangeably used.

In most information systems, there exists a relationship between an administrative task or a business function and a corresponding low-level technical operation on some unit of data in the system, in that the execution of the task automatically involves the modification of the state of the corresponding data to reflect the occurrence of that administrative task.

From an authorization perspective, this relationship provides the means by which to control and specify the ability of a user or a group to perform a specific administrative task. In essence, if the system provides a means to specify who may perform the low-level operation (on some unit of data) that corresponds to the high-level administrative task, then in effect the system provides the means by which one may specify and control who may perform the high-level administrative task.

In this figure, we see an example that illustrates the relationship between an administrative task and the presence of a low-level permission in an object's ACL that has the effect of authorizing the ability of a specific security principal to perform that administrative task on the IT asset represented by that object.

In this figure, an enterprise directory service 38 is depicted. This directory service contains thousands of objects, each of which represent users, groups and other similar types of IT assets. The figure also indicates the presence of a container 41 named Users in the directory service. This Users container contains a user account 42 for John Doe, who is uniquely represented in the system by the SID S-1-5-123-456-789-015. We also note that the owner of this user account is S-1-5-123-456-789-001. Additionally, the figure indicates the presence of two security groups, User Admins 39 and HelpDesk Admins 40, with SIDs S-1-5-123-456-789-026 and S-1-5-123-456-789-001 respectively.

We thus note the presence of the following three security principals in the system:
  User John Doe (S-1-5-123-456-789-015)
  Group User Admins (S-1-5-123-456-789-026)
  Group HelpDesk Admins (S-1-5-123-456-789-001)

The figure also displays the ACL on John Doe's user account. In particular we observe the presence of four ACEs 44, 45, 46, and 47 that the ACL is comprised of.

A simple inspection of the ACEs in the ACL on John Doe's user account reveals the following:
  First ACE 44 allows S-1-5-123-456-789-015 Write Property access to User Password attribute
  Second ACE 45 S-1-5-123-456-789-026 Read Property access to Account Status attribute
  Third ACE 46 allows S-1-5-123-456-789-026 Write Property access to Account Status attribute
  Fourth ACE 47 allows S-1-5-123-456-789-001 Reset Password special permissions Note that a simple inspection of the ACEs in an ACL only reveals that a set of security principals are allowed a set of low-level permissions on this object. If one were to only have access to the information present in the ACL, one could not infer the set of administrative tasks that the permissions in the various ACEs in this ACL reveal to a user.

Let us assume for now that designers of this system have furnished the following information (made available in some form) in regards to the use of the various attributes on user accounts in this system:
  The User Password attribute stores the user's password
  The Account Status attribute represents the status of the account i.e. enabled/disabled In light of this additional information, we can now attempt to infer the set of administrative tasks entitled by the permissions in the various ACEs in this ACL:
  The first ACE 44 allows S-1-5-123-456-789-015 write property access to User Password attribute. In effect, this ACE allows John Doe the ability to modify the User Password attribute and thus we can infer that John Doe can perform the administrative task of changing his password.
  The second ACE allows 45 S-1-5-123-456-789-026 read property access to Account Status attribute. In effect, this ACE allows User Admins the ability to read the Account Status attribute and thus we can infer that User Admins can perform the administrative task of assessing the state of this user account.
  The third ACE 45 allows S-1-5-123-456-789-026 write property access to Account Status attribute. In effect, this ACE allows User Admins the ability to modify the Account Status attribute and thus we can infer that User Admins can additionally also perform the administrative task of disabling this user account and/or enabling this user account if and when it may be in a disabled state.
  The fourth ACE 47 allows S-1-5-123-456-789-001 Reset Password special permissions. In effect, this ACE allows the HelpDesk Admins the ability to reset John Doe's password and thus we can infer that HelpDesk Admins can perform the administrative task of resetting this user account In effect, the inclusion of this additional information in an attempt to infer the set of administrative tasks entitled by the various ACEs in the ACL enabled us to successfully arrive at following inferences in regards to the entitlements of the following users:
  User John Doe is entitled to perform the administrative task of changing his account's password
  All members of the group User Admins are entitled to perform the administrative task of disabling the user account of user John Doe
  All members of the group User Admins are further entitled to performing the administrative task of enabling the user account of user John Doe if it is disabled.
  All members of the group HelpDesk Admins are entitled to perform the administrative task of resetting the password of user John Doe user account Thus, we have seen that the permissions specified (authorization intent) in the ACEs in the ACL of this user object entitled a set of users and groups to perform one or more administrative tasks on the user account represented by this object. In this manner, every authorization intent specification entitles some user of the system to perform some administrative task, or a set thereof. It may be noted though that without the availability of additional information that provided the mapping between a low-level permission and the corresponding administrative that it entitles the user to, the mere inspection of authorization intent specifications in a system does not provide any indication as to the set of administrative entitlements enabled that the presence of these authorization intent specifications.]

NOTE: As noted earlier, in most information systems, there is typically a one to one correspondence between the permission specified in an authorization intent specification and a specific system-level operation. This there typically also exists a mapping between the set of resource-type specific system-level operations (that may be authorized by permissions specified in authorization intent specifications) and the set of business or administrative tasks or functions that these permissions have the effect of authorizing for an entity. Thus, either a set of permission to administrative task entitlements, or a set of system-level-operation to administrative task entitlements may be used to assess the administrative tasks entitled by the presence of specific permissions in authorization intent specifications protecting a securable resource.

In its entirety, the cumulative set of all authorization intent specification that exist in a system in effect entitle various users of the system to perform various administrative tasks on various IT and information assets in the system.

Related Discussion

As mentioned earlier, every information system is usually a connected collection of hosts, computing services and users. We also saw earlier, that the primary purpose of an information system is to allow its users to engage in computing and go about executing on their business functions, and this typically involves the creation, consumption, communication and storage of information assets.

Thus there exists a well-defined universe of administrative tasks that can be carried out in an information system. This well-defined universe of administrative tasks can almost always be grouped into a finite set of categories. Some common categories of administrative tasks in an information system include, and are not limited to account management, host management, resource management, access management, network management etc. Furthermore, because the notion of an administrative task is for practical purposes meaningless without the presence of users who may engage in them, it is meaningful to think of a collection of users who may be responsible for each category of administrative tasks. Note that there may be very well exist multiple collections of users, each engaging in the same category of administrative tasks, albeit with a different scope. Thus there clearly exists in every information system, a need to be able to control and authorize the ability of users or collections thereof to execute an administrative task or a collection thereof.

It may be noted that while the notion of an administrative task and its execution thereof makes complete sense from a human perspective, it makes virtually no sense from a computing device's perspective in that all that a computing device natively understands is operations on bits of data represented as signals in an ocean of memory cells. An operating system does add at least one layer of abstraction and provides the provision to specify fundamental operations such as read and write on units of data. But even at this level of abstraction, the notion of an administrative task and its execution thereof cannot be represented in the computer system.

Thus the designers of an information system are usually required to create an implicit mapping between an administrative task and a corresponding low-level operation that represents the execution of that task in the information system. The designers of an information system are further required to embed a notion of these implicit mappings in the implementation of the system and additionally provide documentation to the users of the system to educate them in regards to the existence of this mapping and the details thereof.

For example, consider a simple category of tasks associated with managing user accounts. The following user account management related administrative tasks immediately come to mind—the creation of a user account, the naming of a user account, the setting of a password for the user account, the optional disabling of a user account and a final deletion of such an account at some point in time in the future.

The designers of the system need to provide the means to (i) represent user accounts in the system (ii) allow the users of the system to be able to perform the various functions associated with user account management and (iii) allow the users or administrators of the system to specify authorization intent governing who can perform these functions associated with user account management. While the designers have a lot of flexibility in designing the system to address this requirement, these requirements need to be addressed.

In regard to (i) above, in most implementations, such a requirement is typically addressed by choosing a specific data structure that the system understands to represent user accounts. The second item (i.e. (ii)) is typically addressed by first making a determination of the complete set of administrative tasks that may be involved in user account management and subsequently mapping each of these administrative tasks to a corresponding low-level system function on some subset of data related to that user account.

For example, if a system implements user accounts as objects of a specifically defined object class called user, then an instance of this object class usually uniquely identifies a unique user account. In addition, perhaps the various attributes defined to be members of that object class might be designed to store specific information each relating to a specific aspect of the user account and by extension, the act of performing a user account management related task on this user might involved the low-level act of modifying the value of a specific attribute on the object.

In this example, let us further assume that the system designers defined an attribute called account-status to denote the status of the account. The system designers further specified that a value of 1 would indicate that the account was a valid active account and that a value of 0 would indicate and mean that the account is in a disabled state. Thus, in specifying an attribute on an account and further specifying the meaning of specific values that the attribute takes on, the designers of the system have implemented a means to denote a specific aspect of the user account. It is evident that it is implied here the act of disabling a user account involves modifying the account-status attribute on that user account and setting it to 0. It is further implied that the act of enabling a disabled user account also involves modifying the account-status attribute on that user account but setting it to 1.

Now in regards to (ii) above, continuing the same example, the designers of the system could provide a user-interface that provides a meaningful visual rendition of the user account and that provides the ability to disable and enable user accounts.

In regards to (iii) above, the system designers need to provide the means by which the users of a system could entitle or authorize someone the ability to disable and enable user accounts. In other worlds, the designers of a system in effect need to additionally provide the means to specify access control for the universe of all administrative tasks in the system. The designers may choose to create a large unique list of permissions corresponding to the ability to perform each unique administrative task or they may choose to create a small common set of permissions corresponding to generic low-level operations such that the target of the operation is specifiable.

For example, the designers could choose to create two special permission titled Disable User Account and Enable User Account and implement logic such that the system understands the meaning of these special permissions and exposes the same in some UI. The benefit of this choice is that there would exist a unique permission for every single administrative task in the system. The drawback of this choice is that because the universe of administrative tasks in a system is very large, the implementation would be expensive, and as such this authorization model would not extensible.

An alternate choice would be design a permission scheme wherein the system might only have a small set of basic low-level permissions for each low-level operation such as read-attribute, write-attribute, create-object, delete-object etc. but that the system would allow for the specification of the specific attribute or object, as the case may be, to be specified along with the permission. So for example, the following permission would be the one used to control whether or not a user could disable a user account or enable a disabled user account—write-property to Account-Status attribute on specific user object. Note that in such a scheme, the system is merely allowing the user to specify permissions for a low-level operation that corresponds to a high level administrative task. Note further that the designers of the system must then provide to the users a list of mappings from the high level administrative tasks to the specific low level operations on a specific class of objects, so that the users could then specify authorization intent and in effect confer various entitlements for business functions over other users.

In such a scheme, the documented user mapping may be important to being able to successfully address requirement (iii) above. In other words, without the knowledge contained in this mapping list, there would be no way for users to authorize specification intent.

Yet another important consequence of the implementation of such a scheme is that the inference of the authorization intents granted would also have to be reverse-mapped to arrive at a list of entitlements conferred upon a user in terms of the various administrative tasks that they are allowed to perform. In other words, a user would have to infer from the presence of a permission such as write-property to Account-Status attribute on specific user object, that the security principal specified along with the permission is entitled to disabling the user account in whose access control list this permission exists and further that the same security principal is also entitled to enabling this user account were it to be in a disabled state.

As a matter of fact, in most commercial implementations of operating systems, it is this second scheme that is used for providing the means to control access to resources and to specify and infer authorization intent.

The following serves as a partial sample list of a documented mapping that might be provided by the designers of an information system to its user:

| # | Administrative Category | Administrative Task | Corresponding system-level operation permission required |
|---|---|---|---|
| 1 | Account Mgmt | Create a user account | Create-child on parent container |
| 2 | Account Mgmt | Delete a user account | Delete on user object |
| 3 | Account Mgmt | Modify account holder name | Write-property on username attribute of corresponding user object |
| 4 | Account Mgmt | Disable user account | Write-property on auk attribute of corresponding user object |
| 5 | Account Mgmt | Enable user account | Write-property on uac attribute of corresponding user object |
| ... | Account Mgmt | ... | |
| 51 | Account Mgmt | Reset account password | Extended-right Reset-password on corresponding user object |
| 52 | Group Mgmt | Create a group | Create-child on parent container |
| 53 | Group Mgmt | Delete a group | Delete on group object |
| 54 | Group Mgmt | Modify group membership | Write-property on member attribute of corresponding group object |
| ... | Group Mgmt | ... | |
| 78 | Group Mgmt | Modify group type | Write-property on type attribute of corresponding group object |
| 79 | Host Mgmt | Add host to domain | User-right Add host to domain on domain root |
| 80 | Host Mgmt | Rename host name | Write-property on name attribute of corresponding computer object |
| ... | Host Mgmt | ... | |
| 151 | Network Mgmt | Add DHCP server to network | Write-property on add-dhcp-ok attribute of corresponding site object |
| 152 | Network Mgmt | Configure DHCP server | Write-property on options attribute of corresponding computer object |
| 153 | Network Mgmt | Add DNS server to network | Membership in domain's Domain Admins group required |
| 154 | Network Mgmt | Configure DNS server | Write-property on options attribute of corresponding computer object |
| ... | Network Mgmt | | |
| 246 | Content Mgmt | Add content on intranet server | Content-publisher role entitled for user on intranet web-server |
| ... | Content Mgmt | | |
| 1362 | Access Mgmt | Access financial database | Database-readers role entitled for user in financial database manager |
| ... | Access Mgmt | | |
| 4000 | ... Mgmt | ... | |

NOTE: As this sample table indicates, there may exist more than one authorization models in an information system, as there may exist multiple resources managers, each of which may adhere to a different authorization model. The most prevalent model is that of object-based authorization; other models include role- and rule-based authorization.

As it pertains to the assessment of a user's entitlements, those of ordinary skill in the art will appreciate that the assessment of a user's entitlements in a system that implements such a design involves a detailed and complete analysis of each and every individual authorization intent specification across a very large number of ACEs that exist in a large number of ACLs, each of which protects a single information asset (i.e. resource) and further involves the act of reverse-mapping low-level permissions into high level administrative tasks and that an accurate mapping further takes into account the nature of the resource and an associated inference of the scope of administrative authority. This is yet another aspect of this invention.

One may further appreciate that in an information system in which there may exist various types of resource managers, a complete and reliable assessment would additionally have to take into account numerous aspects, each of which would be unique to the specific type of resource managers that may exist in the system. For example, should there exist a resource manager in the system that grants access to a specific information asset based on a roles-based access control model, the entitlement assessment method and system would additionally have to know how to assess a roles-based authorization scheme and subsequently infer a user's entitlements set.

Figure 8:
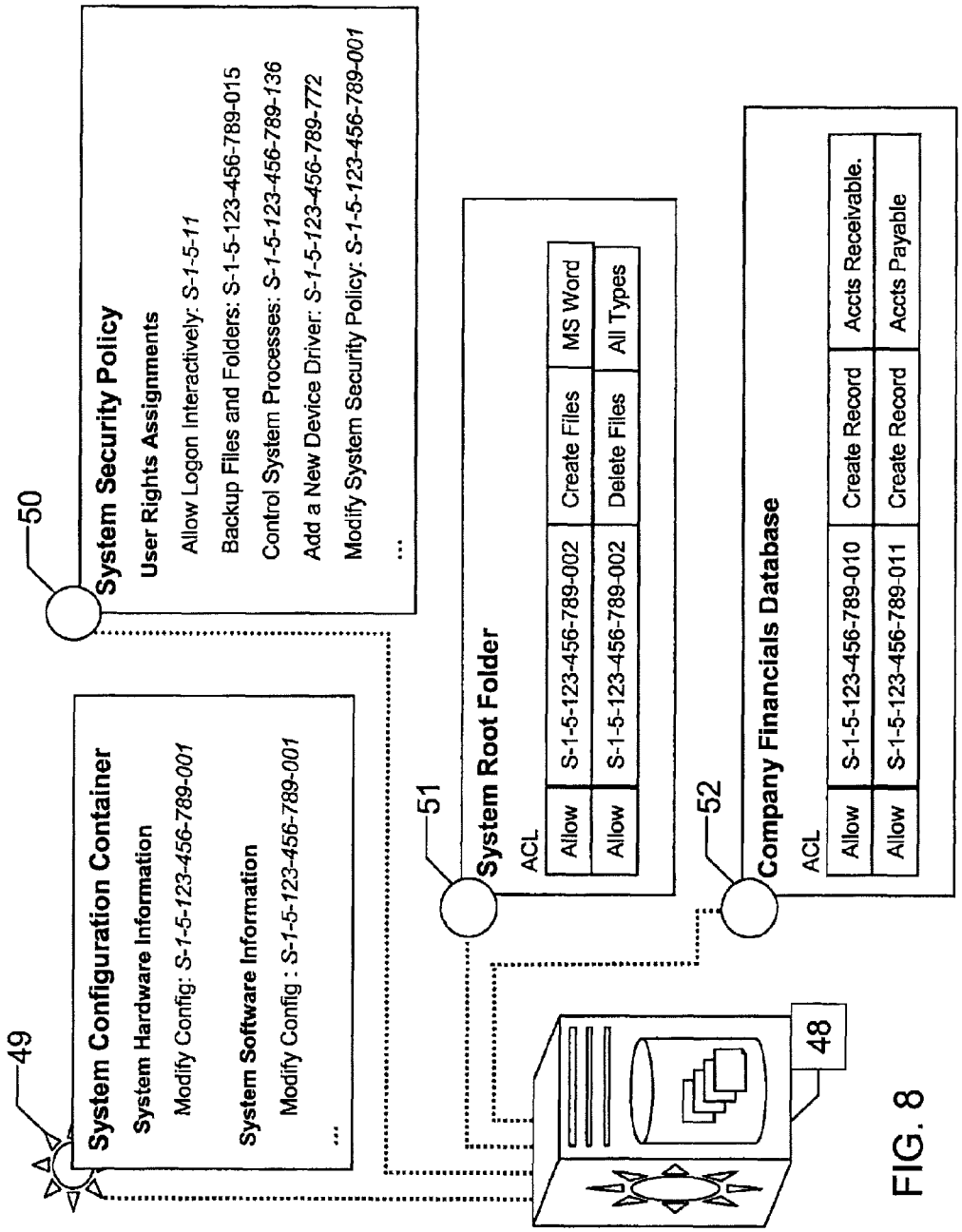
FIG. 8 depicts a diagram illustrating the different kinds of authorization intent specifications that may exist on a host in an information system.

FIG. 8 depicts a diagram illustrating the different kinds of authorization intent specifications that may exist on a host in an information system.

An information system is comprised of a large set of information and IT assets, each of which may be stored in various forms in the underlying system, and access to each of which may be facilitated by the a resource manager that implements one of a small set of authorization models.

This figure serves to depict the presence of a small number of individual resource managers that together provide protection for the set of all information and IT assets on a host, each of which may be implemented by one of a specific set of low-level data structures that these resource managers understand and serve to protect.

This figure illustrates a host 48 and depicts the presence of numerous types of authorization intent specifications, each serving to protect some information on that host.

The System Configuration Container 49 contains a hierarchical database of vital system information. Associated with each of the two system information sets is a unique authorization intent specification. For example, as is illustrated, the security principal with the SID S-1-5-123-456-789-001 is authorized to modify the system's hardware configuration. Similarly, the security principal with the SD S-1-5-123-456-789-001 is authorized to modify the system's software configuration.

It may be noted that in this system depicted in this example, the granularity of authorization intent specification governing the modification of the system's hardware and software configuration is highly coarse. It may be additionally noted that a security principal (user or group) that is authorized to modify the system configuration by the presence of these coarse authorization intent specification is in effect also entitled to performing all the administrative tasks that may involve the modification of the system's software or hardware configuration.

For example, the following is a small sub-set of administrative tasks that involve the modification of the system's software or hardware configuration: (i) Enable local printing on this host by adding a printing device and installing the associated device driver and application software required for the print management; (ii) Install a new application on this host; (iii) Modify the amount of RAM on this host; (iv) Partition the hard-drive of this host; etc.

Thus in effect, the presence of the permissions specified in this System Configuration Container entitle the user or group with SID S-1-5-123-456-789-001 to perform all the tasks listed above and all the tasks that involve the modification of the system's configuration.

Similarly, the System Root Folder 51 which represents the root of a hierarchical file-system on this host has an ACL attached to it. It may be noted that while not depicted in this illustration, each file in this file system also has a unique ACL attached to it. The ACEs in the ACL attached to the root of the hierarchical file system allow the user or group with HD S-1-5-123-456-789-002 to create files of type word in this file system and additionally allows this user or group to delete files of all types in this file system. In effect, the permissions specified in the ACL of the root object entitle the user or group with SID S-1-5-123-456-789-002 to create information assets of type word and additionally entitle this user or group to destroy any and all information assets that may reside in the file system on this host.

On a similar note, the Company Financials Database 52 is also hosted on this system and has an ACL attached to it. The ACEs in the ACL of this database allow the user or group with SID S-1-5-123-456-789-010 to create records in the Accounts Receivable table, and allow the user of group with HD S-1-5-123-456-789-011 to create records in the Accounts Receivable table. In effect these permissions entitle the user or group with SID S-1-5-123-456-789-010 to perform the administrative task of modifying the list of entities to which payment is due and entitles the user or group with SID S-1-5-123-456-789-011 to perform the administrative task of modifying the list of entities from whom payment is due.

Finally, the illustration also depicts the presence of authorization intents that serve to protect the host itself. The Systems Security Policy store 50 contains a set of authorization intent specifications in the form of system defined user-right and value pairs. Each one of these system defined user-rights specifies and controls a specific set of actions that a user may perform on this system. Associated with each one of these system defined user-rights is a value that serves to specify the user or group to whom the user-right may be granted.

Thus, as illustrated in the figure, there exist the following user rights assignments in the system:

Allow Logon Interactively: S-1-5-11
Backup Files and Folders: S-1-5-123-456-789-015
Control System Processes: S-1-5-123-456-789-136
Add a New Device Driver: S-1-5-123-456-789-772
Modify System Security Policy: S-1-5-123-456-789-001

These user rights assignments in effect provision the following entitlements:

The user or group with SID S-1-5-11 is entitled to performing the administrative task of accessing this host interactively.

The user or group with S-1-5-123-456-789-015 is entitled to performing the task of backing up information assets stores on this host.

The user or group with S-1-5-123-456-789-136 is entitled to performing the following administrative tasks—(a) Modifying the protection afforded to this host (by virtue of being able to control the local security authority system process), (b) Controlling the availability of the Company Financials Database (by virtue of the fact that it happens to be run as a system process) etc.

The user or group with S-1-5-123-456-789-772 is entitled to performing the following administrative tasks—(a) Modifying the protection afforded to this host (by virtue of being able to add a device driver to this system; all device drivers run in kernel mode as does critical security code), (b) Modifying the hardware configuration of this host (by virtue of being able to add a hardware device driver) etc.

The user or group with S-1-5-123-456-789-001 is entitled to performing the administrative task of provisioning access to this host and additionally performing the administrative task of provisioning access to any and every information and IT on this host.

Thus, as illustrated by the example in this figure, we have seen that there exist various kinds of authorization intent specifications on a host in an information system, each of which is enforced by a resource manager. We have also seen that each of these authorization intent specifications entitles some user or group to performing some administrative ask.

We may thus conclude that an accurate assessment of a user's cumulative entitlements in a system involves an evaluation of numerous types of authorization intent specifications and additionally involves the inclusion the mappings between these various kinds of permissions (that may exist across these numerous types of authorization intent specifications) and the corresponding administrative tasks that the presence of such permissions serve to entitle.

Figure 9:
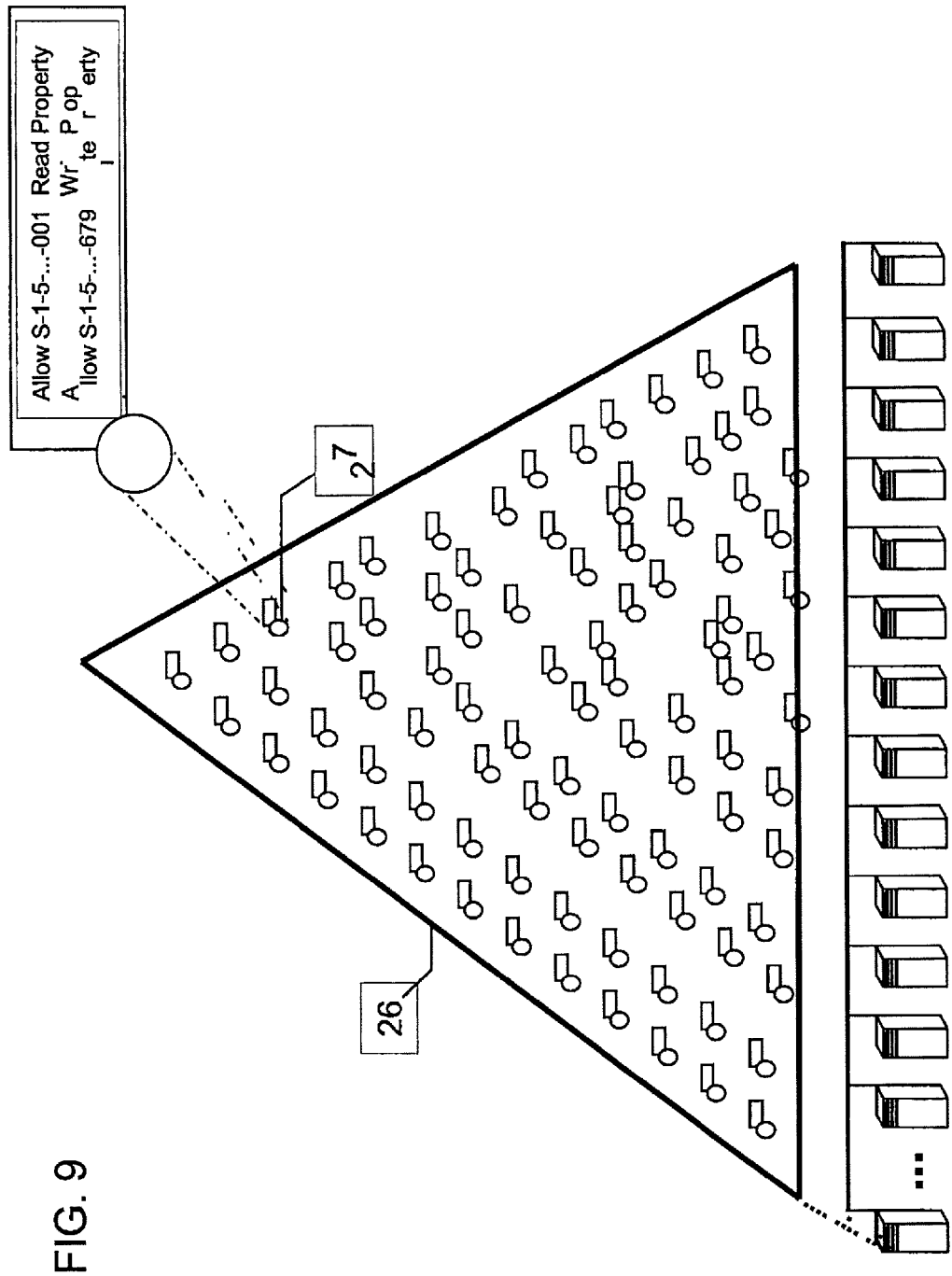
FIG. 9 depicts a diagram illustrating the presence of a large number of authorization intent specifications in a subset of an information system.

FIG. 9 depicts a diagram illustrating the presence of a large number of authorization intent specifications in a subset of an information system.

An information system is comprised of a large number of IT and information assets, each of which may be stored on file systems, databases and directory services across thousands of hosts in the information system.

In this diagram, we see an enterprise directory service 26 which represents a subset of an information system. This directory service contains thousands of objects 27 each one of which represents a unique IT asset, such as user accounts and security groups, and each one of which is protected by an ACL that is comprised of a set of ACEs that individually represent an authorization intent specification.

Thus, one may conclude that even a mere subset of an information system can contain thousands of objects representing information and IT assets, each of which is protected by an ACL, and associated with each of these objects are numerous individual authorization intent specifications, that in their entirety result in the presence of thousands of authorization intent specifications across this subset of an information system.

Thus in a mere subset of an information system there exist thousands of authorization intent specifications that collectively entitled a large set of users of the system to a large set of administrative tasks, the assessment of which would require the evaluation of each individual authorization intent specification that exists in the system and the inference of the set of administrative tasks that correspond to the individual permissions in each of these authorization intent specifications.

Figure 10:
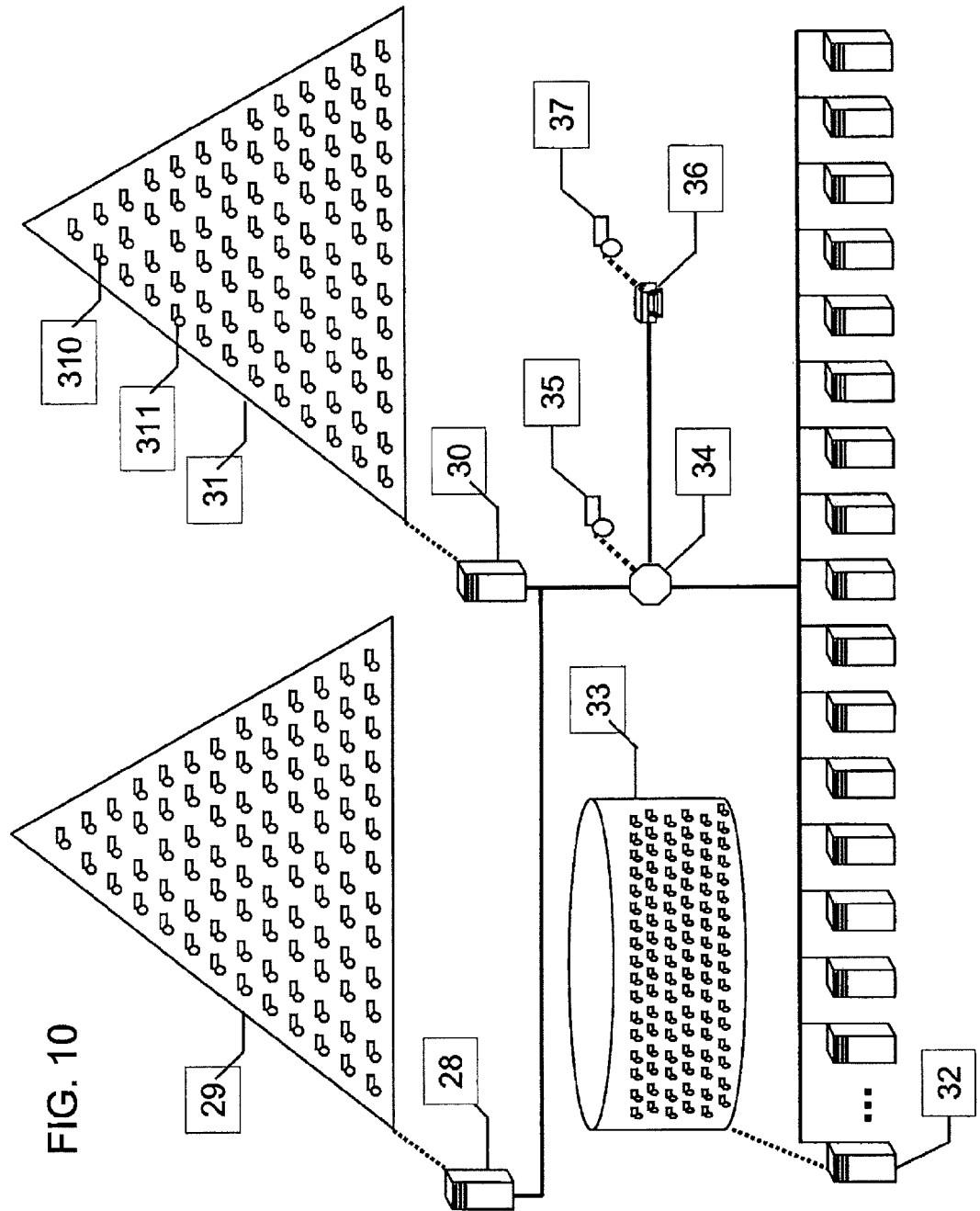
FIG. 10 depicts a diagram illustrating the presence of a large number of authorization intent specifications across an entire information system.

FIG. 10 depicts a diagram illustrating the presence of a large number of authorization intent specifications across an entire information system.

This figure serves to communicate a measure of the vastness of a medium to large information system and it serves to suggest that the determination of a user's entitlements in an information system involves an examination and analysis of vast amounts of authorization entitlement specifications across the information system.

The figure illustrates a medium to a large information system as one consisting of a multiple security domains 29, 31, thousands of hosts 32, users 310, groups 311 and hundreds of thousands of information and IT assets stored on thousands of hosts 33 or in enterprise directories or databases. The figure additionally illustrates the presence of hundreds of thousands of unit authorization intent specifications 35 (ACLs) and over a million individual authorization intent specifications (ACEs), each individually protecting the large number of information and IT assets that the information system is comprised of.

Furthermore, in a typical information system, information asset owners specify authorization intent for their owned assets. In doing so they may specify permissions for a user or for a collective (i.e. group). Such a group could be one that they control the ownership of or could be on that they have no control over. The owner of a group and anyone explicitly or implicitly authorize to modify its membership could additionally modify the membership of the group, the act of which would instantly impact the cumulative set of entitlements of the users who may now have been added to the group or removed from the group. A group may additionally be a member of another group and so on. In effect, we see that there exist numerous factors, many of which are dynamic in nature that end up impacting the cumulative set of entitlements of a user, or a collective thereof.

The astute mind may also observe that there exist a large number of information and IT assets, each owned and administered by one of a large number of users or collectives thereof in the information system. In such an information system, there may exist numerous authorization intent specifications for a given user or a collective thereof, scattered across the information specified and put in place by individual resource owners and administrators, thus resulting in a situation wherein neither the user him/herself or herself nor any one single entity (user, administrator, manager, group etc.) in the information system will have complete knowledge of the entirety of the user's entitlements.

It is thus clearly evident that the cumulative entitlements of a user of an information system of this scale would easily span large parts of the information system and would cumulatively authorize the user to perform a large set of administrative operations on a large set of information and IT assets across the information system. Furthermore it is also evident that neither the user him or herself nor any one single entity (user, administrator, manager, group etc.) in the information system will have complete knowledge of the entirety of the user's entitlements.

Figure 11:
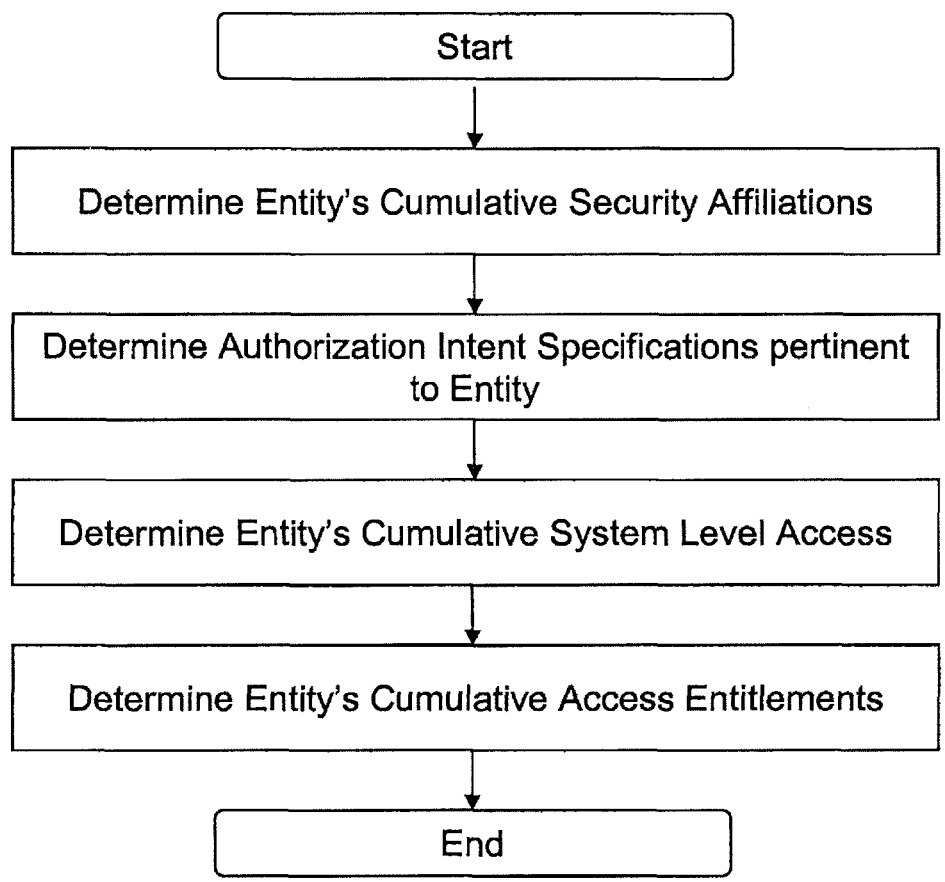
FIG. 11 depicts a diagram of the summary of the cumulative entitlements assessment method which is a salient part of this invention.

FIG. 11 depicts a flow diagram of a cumulative entitlements assessment method in accordance with the invention This cumulative access entitlement assessment method assesses cumulative access as follows:

The method determines the cumulative set of security affiliations of the entity whose access entitlements are to be assessed. For example, in some embodiments, if the entity were a user, the method determines the set of security groups to which the user may directly or indirectly belong by examining the group membership of all security groups in the system to determine all security groups to which the user belongs directly and recursively performing the same examination for all security groups to which the user directly belongs to finally arrive at the user's cumulative set of security group memberships. This may be accomplished, for example, by configuring a processor through program instructions to command reading of data in data structures containing security group membership information, to determine from the data the security groups to which the user belongs, and to command storage in memory, volatile or non-volatile, of data indicating the security groups to which the user belongs.

The method then determines the cumulative set of authorization intent specifications that specify access for the entity or any of his security affiliations, across the specified scope of the access assessment. For example, in some embodiments, if the entity were a user, and the resources specified within the scope of the assessment were protected by access control lists (ACL), wherein ACL were comprised of a set of access control entries (ACEs), wherein each ACE specified some form of access for some entity, such as a user or a security group, then, the method examines the entity specified in every ACE in every ACL on every resource that is within the scope of the assessment, and based on these examinations, make a determination of all ACEs that specify some form of access for either the entity himself or for some security group to which the user directly or indirectly belongs. Again, in many embodiments this is accomplished by configuring a processor to command reads of appropriate data structures, to compare the data in the data sectors with data indicating security groups of the user, and to command storage in memory of the results of the comparison.

The method then determines the cumulative system-level access granted to the entity by the entity's cumulative set of authorization intent specifications. For example, in some embodiments, if the entity were a user, and access control entries (ACEs) were the unit of an authorization intent specification, then the method would examine the permissions specified in each individual ACE in the user's cumulative set of authorization intent specifications, and determine the system-level access or operation authorized by the permissions granted in the ACE to arrive at a set of all system-level operations that are authorized for this user and for all his security group memberships. Again, in many embodiments this is accomplished by configuring a processor via program instructions, resulting in the processor reading, comparing, and storing data as appropriate.

The method then determines the cumulative access entitlement conferred upon the entity by mapping the entity's cumulative system-level access to the entity's cumulative set of access entitlements. For example, in some embodiments, if the entity were a user, and a determination of the user's cumulative set of authorized system-level operations had been made, the method would then examine each system-level operation authorized for this user and for each system-level operation authorized, use a set of mappings from system-level operations to administrative tasks to determine the administrative task that corresponds to this authorized system-level operation, and in this manner, determine the set of all administrative tasks that this user is entitled to perform within the part of the system that constituted the scope of the assessment. Again, in many embodiments this is accomplished by configuring a processor via program instructions, resulting in the processor reading, comparing, and storing data as appropriate. In many embodiments the processor is also configured to command display of the data, indicative of the cumulative access entitlement of for example the user, on a display.

In this manner, the cumulative access entitlement method determines an entity's cumulative access entitlements within the part of the system that constituted the scope of the assessment.

Figure 12:
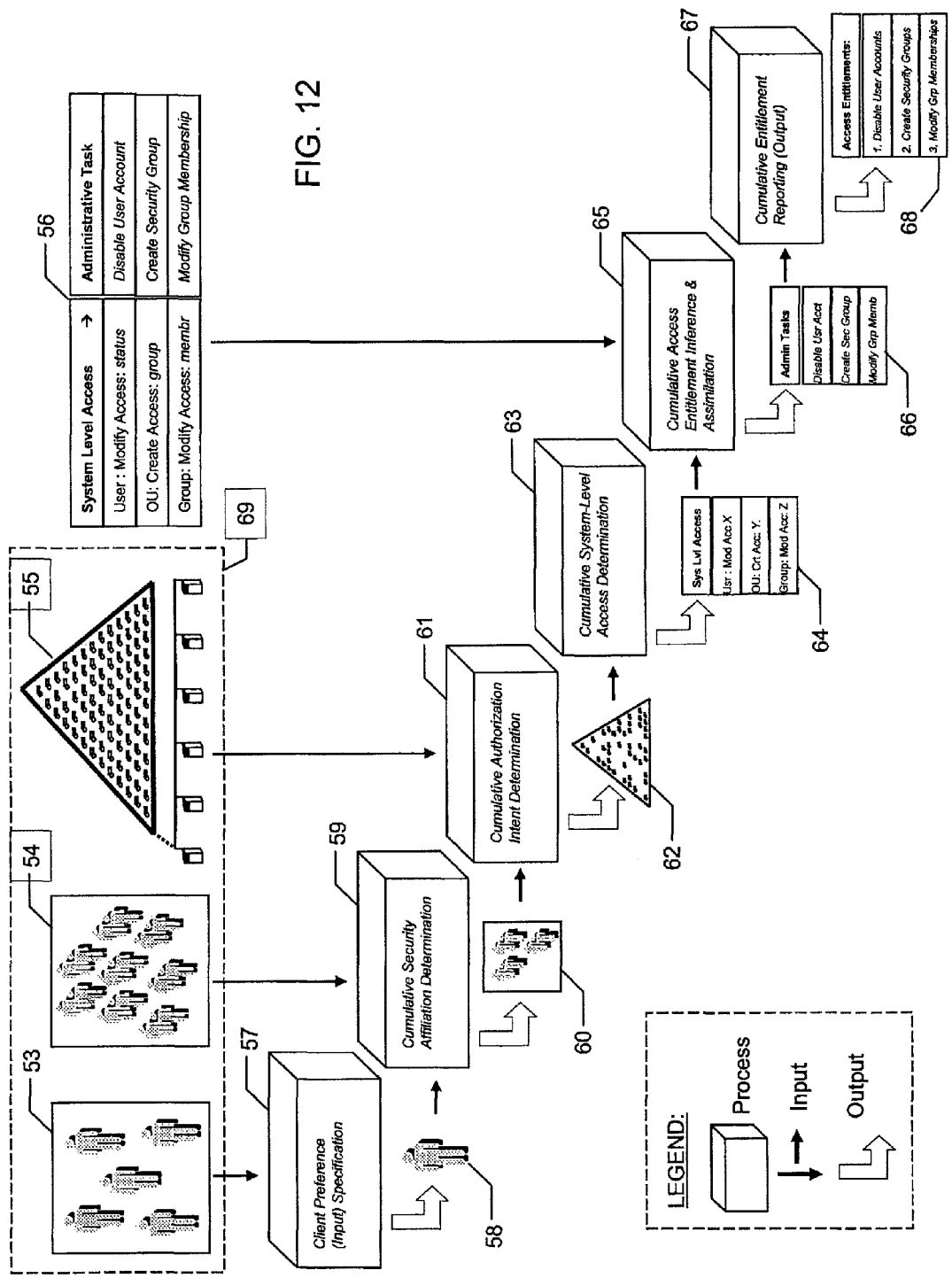
FIG. 12 depicts a diagram of an overview of the cumulative entitlements assessment method which is a salient part of this invention.

FIG. 12 depicts a flow diagram of a further embodiment of a cumulative entitlements assessment method in accordance with the invention This figure serves to provide an overview of an embodiment of the cumulative access entitlement method.

As is depicted in the figure, an information system 69 is typically comprised of a set of entities 53, commonly referred to as users, a set of entity collectives 54, most commonly referred to as security groups, and a set of authorization intent specifications 55 that exist to protect securable resources which represent information/IT assets and may take various forms such as but not limited to hosts, folders, files, applications, databases, database content, directory services, directory service content etc.

The cumulative access entitlement assessment method determines the cumulative access entitlements conferred upon an entity of an information system.

The Client Preference (Input) Specification 57 process accepts manual or automated user input that specifies the identity 58 of a specific entity in the information system, whose access entitlements are to be assessed. This step thus determines the identity of the specific entity 58, from among a set of entities 53 in the information system 69, whose access entitlements are to be assessed. Note: User input may also optionally involve the specification of the scope of the assessment i.e. a specifiable subset of the information system within which access entitlements are to be assessed. In the absence of a specified scope, the method may proceed to assess access across either the entire information system or the most logical specifiable subset of the information system.

The Cumulative Security Affiliation Determination 59 process involves the determination of the entity's cumulative set of security affiliations 60 based on the entity's identity 58, i.e. the set of all security entity collectives in the system with which this entity 58 may be affiliated, either directly or transitively, and which may be used in the information system to specify some authorization intent on some securable resources in the information system. In most systems, entity collectives or aggregators are manifested as security groups or security roles, and accordingly, in such systems, a security affiliation is manifested as a membership in some security group or the inclusion in some security role. This step thus determines the subset of all entity collectives 60, from amongst the set of all entity's collectives 54 in the information system 69, with which this entity 58 may be affiliated.

The Cumulative Authorization Intent Determination 61 process involves the determination of the entity's cumulative set of authorization intent specifications 62, based on the entity's cumulative set of security affiliations 60, i.e. the set of all authorization intent specifications that exist within that portion of the information system that comprises the scope of the assessment, and that authorize some access either for the entity 58 itself or for some entity collective with which this entity 58 may be affiliated. In most systems, authorization intent specifications take the form of access control entries (ACEs) which are a part of access control lists (ACLs) which serve to protect the securable resource with which they are associated. This step thus determines the subset of all authorization intent specifications 62, from amongst the set of all authorization intent specifications 55 that exist in the information system 69, that specify some form of access for either the entity 58 itself, or for some entity collective with which this entity 58 may be affiliated i.e. the some entity collective which belongs to the entity's cumulative security affiliation set 60.

The Cumulative System-Level Access Determination 63 process involves the determination of the entity's cumulative set of system-level access 64 across the specified scope of the information system, based on the entity's cumulative set of authorization intent specifications 62, i.e. the set of all system-level operations that the entity 58 is authorized to perform, in view of all the permissions specified across the entity's cumulative authorization intent specification set 62 and in view of at least some, and usually all pertinent, access check methodologies implemented in the information system. This step thus determines the set of all system-level operations 64, that are effectively authorized for the entity 58, by virtue of the cumulative set of authorization intent specifications 62 that exists across the specified scope of the information system for the entity 58 or any of its security affiliations 60.

The Cumulative Access Entitlement Inference & Assimilation 65 process involves the determination of the entity's cumulative access entitlement set 66 across the specified scope of the information system, based on the entity's cumulative system-level access grants 64 and based on a set of system-level operation to administrative task mappings 56 i.e. the set of all administrative tasks that the entity 58 is entitled to performing, based on the entity's effective cumulative system-level access 64 across the specified scope of the information system. This set of system-level operation to administrative task mappings 56 provide the mappings required to determine the administrative task that corresponds to a system-level operation authorized on a specific type of securable resource. This step thus determines the set of all administrative tasks 66 that the entity 58 is entitled to perform across the specified scope of the information system, by virtue of the cumulative set of authorization intent specifications 62 that exists across the specified scope of the information system for the entity 58 or any of its security affiliations 60.

The Cumulative Entitlement Reporting (Output) 67 process reports the results of the cumulative access entitlement 68, which are in effect the same as 66, presented in a meaningful fashion.

In this manner, the cumulative access entitlement method determines the set of all administrative tasks 66 and thus the entity's cumulative set of access entitlements 68 across the specified scope of the information system. It may be noted that 66 and 68 are tantamount to each other. Note: It may be noted that steps one and six, as outlined above, are optional non-essential aspects of this method, which could easily be assimilated in steps two and five above respectively.

FIG. 13 depicts a diagram of an overview of the cumulative entitlements assessment system.

This figure serves to provide an overview of an embodiment of a cumulative entitlement system which implements the computing logic for the method of cumulative entitlement assessment.

As is depicted in the figure, the system consists of seven modules, each of which is responsible for a specific function, and these seven modules are driven by a simple control flow engine 77. Note: It may be noted that the requirement to have seven unique modules is not an architectural limitation of this invention. The method and the system of this invention can very well be implemented in a single module or in multiple modules. The distribution of the logical functions involved in the process of cumulative access entitlements into seven modules is merely a preference of the designers of the method and system.

The Control Flow Engine 77 serves to coordinate the functionality of each of the seven modules and to control the flow of the implemented computing logic from the beginning to the end of the assessment.

The Client Preference (Input) Specification Module 70 interacts with the client of the system to determine the scope of the assessment i.e. a determination of the specific sub-set of or the entirety of the information system and to optionally allow the client to specify an alternate set of security credentials which may be used to access various pieces of information during the course of the assessment. This module also allows the user to specify the specific type of assessment to be performed. Control is then passed to the appropriate module.

The Cumulative Security Affiliation Determination Module 71 determines a user's cumulative set of security affiliations. This module also provides a facility to the client of the cumulative access assessment system to specify the user for whom the assessment needs to be performed.

The Cumulative Authorization Intent Determination Module 72 determines the set of cumulative authorization intents that exist for the user within the specified scope of the information system.

The Cumulative System-Level Access Determination Module 73 determines the cumulative set of system-level access authorized for the user within the specified scope of the information system.

The Cumulative Access Entitlement Inference & Assimilation Module 74 infers and assimilates the user's cumulative administrative entitlements within the specified scope of the information system by mapping the cumulative system-level access authorized for the user to the corresponding set of administrative tasks that the user is entitled across the specified scope of the information system.

The Cumulative Entitlement Reporting (Output) Module 75 outputs the results of the cumulative assessment with the user in a meaningful manner.

The Custom Security Access Assessment Module 76 is designed to be extensible and as such is responsible for delivering the entire set of related custom security access assessments as may be specified.

Figure 14:
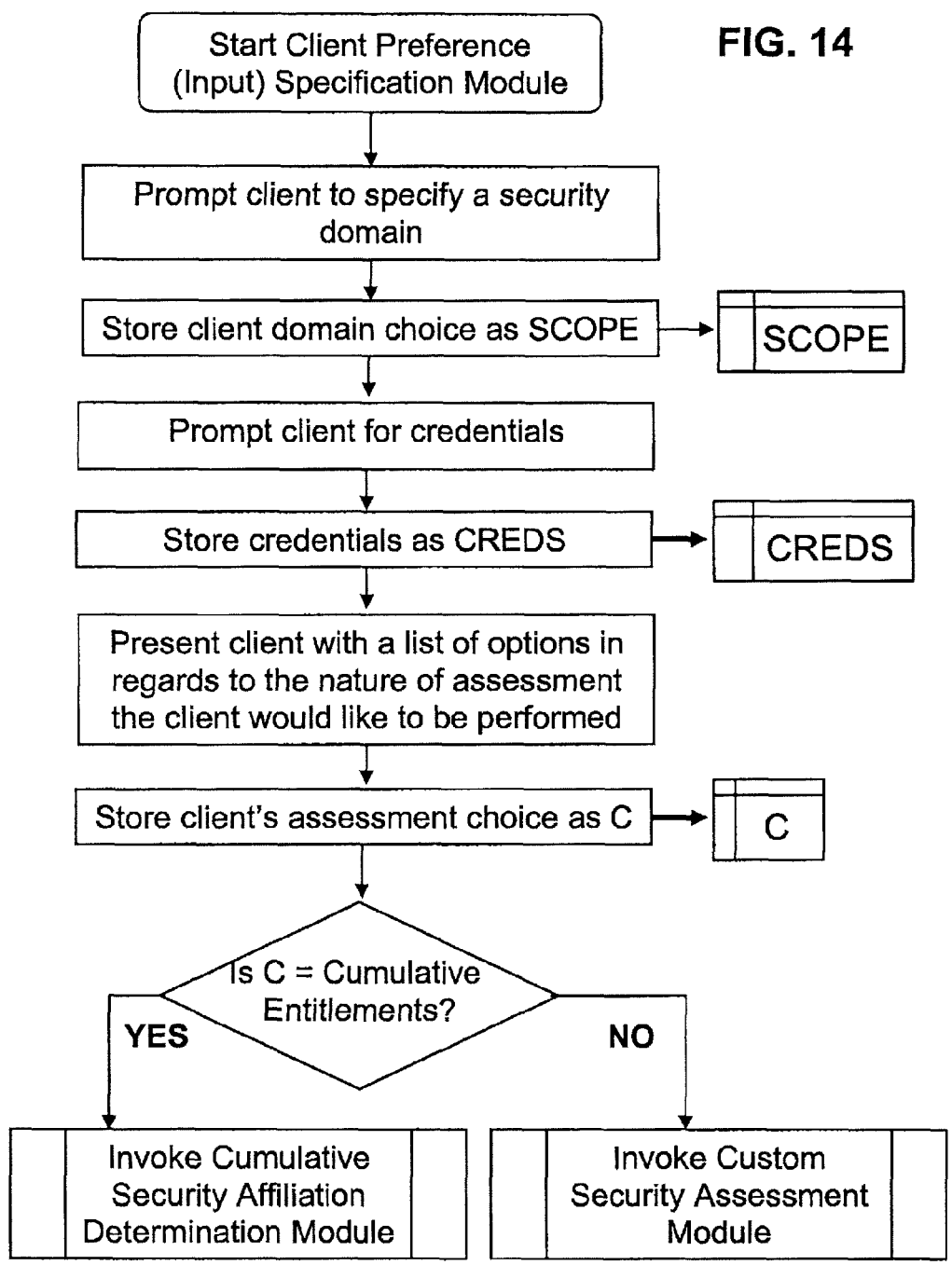
FIG. 14 discloses a flow chart which describes the operation of the Client Preference (Input) Specification module.

FIG. 14 discloses a flow chart which describes the operation of the Client Preference (Input) Specification module This figure serves to describe the logic implemented in an embodiment of a Client Preference (Input) Specification module.

The logic implemented in this module begins by prompting the client of the system to specify the scope of the information system within which the assessment is to be performed. NOTE: Note that while the client is prompted to specify a security domain as a scope, in general, the module may allow the user to input any valid subset of the information system the boundary of which is specifiable. It may further be noted that this use of a security domain as the unit of scope specification is merely a preferred unit and as such it should be recognized that it does not represent an architectural limitation for the present invention. Examples of valid scopes include a security domain or a set thereof, a node or a sub-tree in a directory service, a computing device or a set thereof, a folder on a file-system or a set thereof in a computing device, a set of computing devices in a network segment, an application or a set thereof running on a computing device, a database or a set thereof in an application, a tables or a set thereof in a database, etc.

The logic implemented in this module begins by saving the client specified scope in a variable called SCOPE; the SCOPE variable may be accessible by all modules of the system. The logic implemented in this module then proceeds to prompt the client of the system to enter an optional set of credentials that may be used in performing the various steps involved in the process of this assessment. The logic implemented in this module then saves the client specified alternate credentials in a variable called CREDS; the CREDS variable may be accessible by all modules of the system. In the absence of any optionally specified credentials, the default set of credentials is used, which is the set of credentials under which this system was invoked.

The logic implemented in this module then proceeds to present to the client of the system a list of the various security assessments that the system is capable of performing.

The logic implemented in this module then saves the client specified security assessment option in a variable called C (for choice); the C variable may be accessible by all modules of the system.

The logic implemented in this module then proceeds to invoke either the Cumulative Security Affiliation Determination Module or the Custom Security Assessment Module, depending upon the choice specified by the client of the system.

Figure 15:
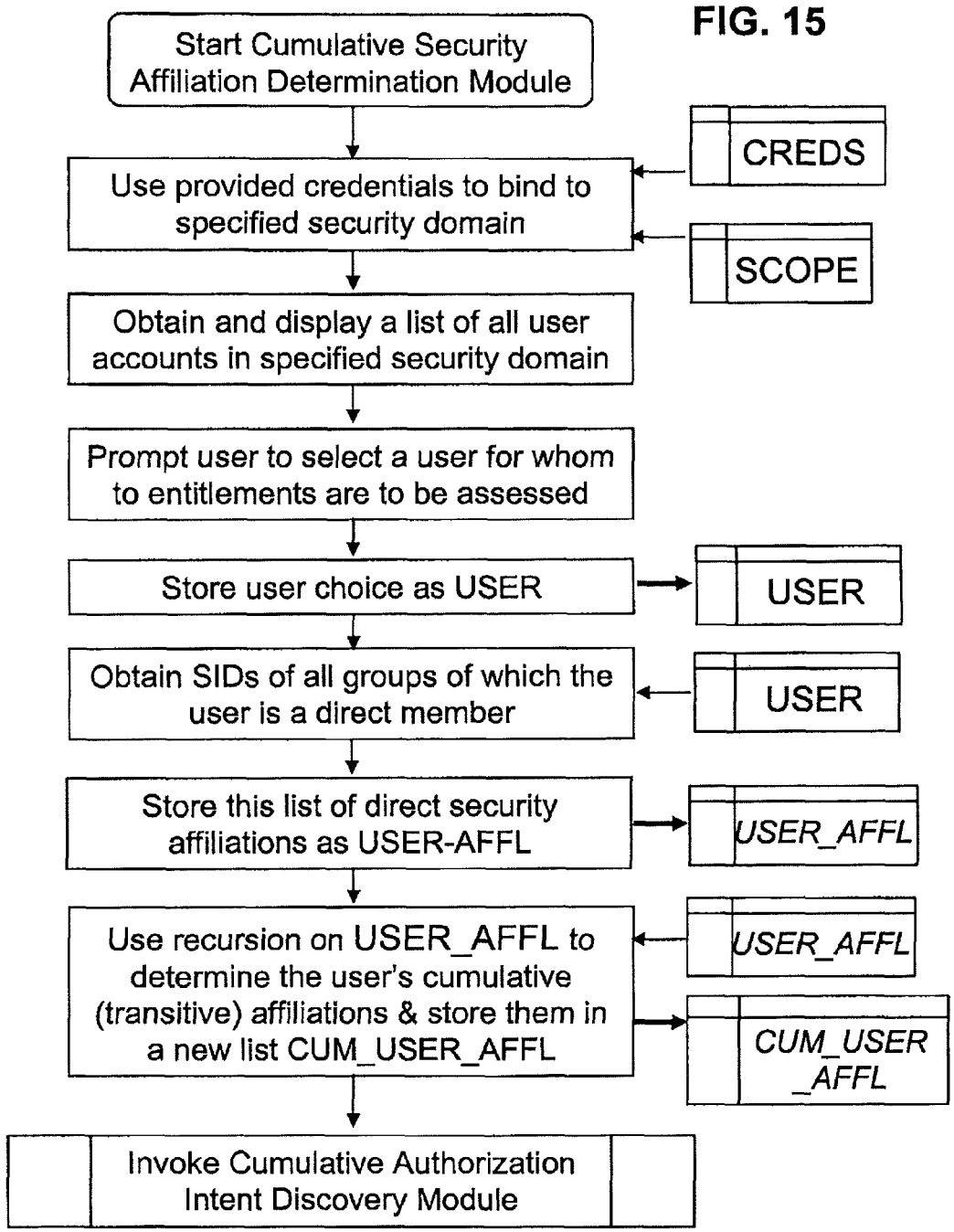
FIG. 15 discloses a flow chart which describes the operation of the Cumulative Security Affiliation Determination Module.

FIG. 15 discloses a flow chart which describes the operation of the Cumulative Security Affiliation Determination module.

This figure serves to describe the logic implemented in an embodiment of a Cumulative Security Affiliation Determination module.

The logic implemented in this module begins by binding to the security domain specified in the globally available SCOPE variable by using the client specified credentials CREDS, or in the absence of any specified credentials, using the default credentials. Binding generally involves authenticating to the security domain with valid credentials.

The logic implemented in this module then queries the security domain to obtain a list of all users in the security domain. This list of users is then presented to the client and the client is asked to select a user for whom the client would like the cumulative assessment performed. The clients choice is then stored in the globally available variable USER. Note: It may be noted that the querying of the security domain to obtain a list of users may be an optional aspect of this module. The module could alternatively or additionally provide the means to have the client directly specify a user for whom the cumulative assessment is to be performed.

The logic implemented in this module then proceeds to obtain a list of every security collective that the user is directly affiliated with and stores this list in a global variable called USER_AFFL, which stands for user affiliations. In most systems, the notion of security affiliations is implemented by the use of security groups. Thus, in the flowchart, the word security group has been used in place of security affiliations. Note: The systems and methods of this invention can process virtually any type of security affiliation collective that may be used in an information system to aggregate entities for the purposes of specifying access intent. Common examples of such security affiliations include security groups and security roles.

Note that the words "security affiliations" and "security groups" may be interchangeably used.

After the logic implemented in this module has obtained a list of all security groups of which the user is a direct member, the logic implemented in this module proceeds to determine the transitive set of security groups to which this user may belong, either directly or indirectly. This is an essential and vital determination because a user may be a member of a group that is in turn a member of another group to which access has been granted on some resource. This nested group membership will come into play during an access check and thus needs to be taken into account for the purpose of assessing a user's cumulative entitlements.

The logic implemented in this module employs recursion as a means of determining the transitive set of security groups to which this user may belong, either directly or indirectly. In effect, it employs a recursive function that takes USER_AFFL as input and recursively determines the list of all security groups to which every member of USER_AFFL belongs. At the end of this recursive process, the logic implemented in this module has successfully determined the transitive set of security groups to which this user may belong, either directly or indirectly; it then proceeds to store this list of transitive group memberships in the global variable CUM_USER_AFFL, which stands for cumulative user affiliations Note: Most information/operating systems define and implement a specific algorithm that governs the determination of the cumulative set of a user's group memberships that would be taken into account for the purposes access control. In most cases, this algorithm usually comes into play during the establishment of (some implemented notion of) a logon session that uniquely identifies the user's computing session. This process is commonly referred to as token generation. The token generation algorithm defines a set of rules that govern the specific types of security groups (of which the user is a member) that may be added to the user's token. This security affiliation module adheres to the rules set forth by the underlying information/operating system's token generation mechanism when transitively determining and adding the cumulative set of security affiliations for the user.

In this manner, at the end of this process, the CUM_USER_AFFL AUTH_LIST contains a list of the user's security identifier and the identifier of every security group (i) of which the user may be a member, either directly or indirectly, and (ii) that would ordinarily be a part of the user's token as generated by the underlying operating system when the user logs on the system, and as would come into play during an access check that would occur should the user attempt to access a securable resource in the specified portion of the information system that is the scope of this assessment.

It then proceeds to invoke the Cumulative Authorization Intent Discovery module.

Figure 16:
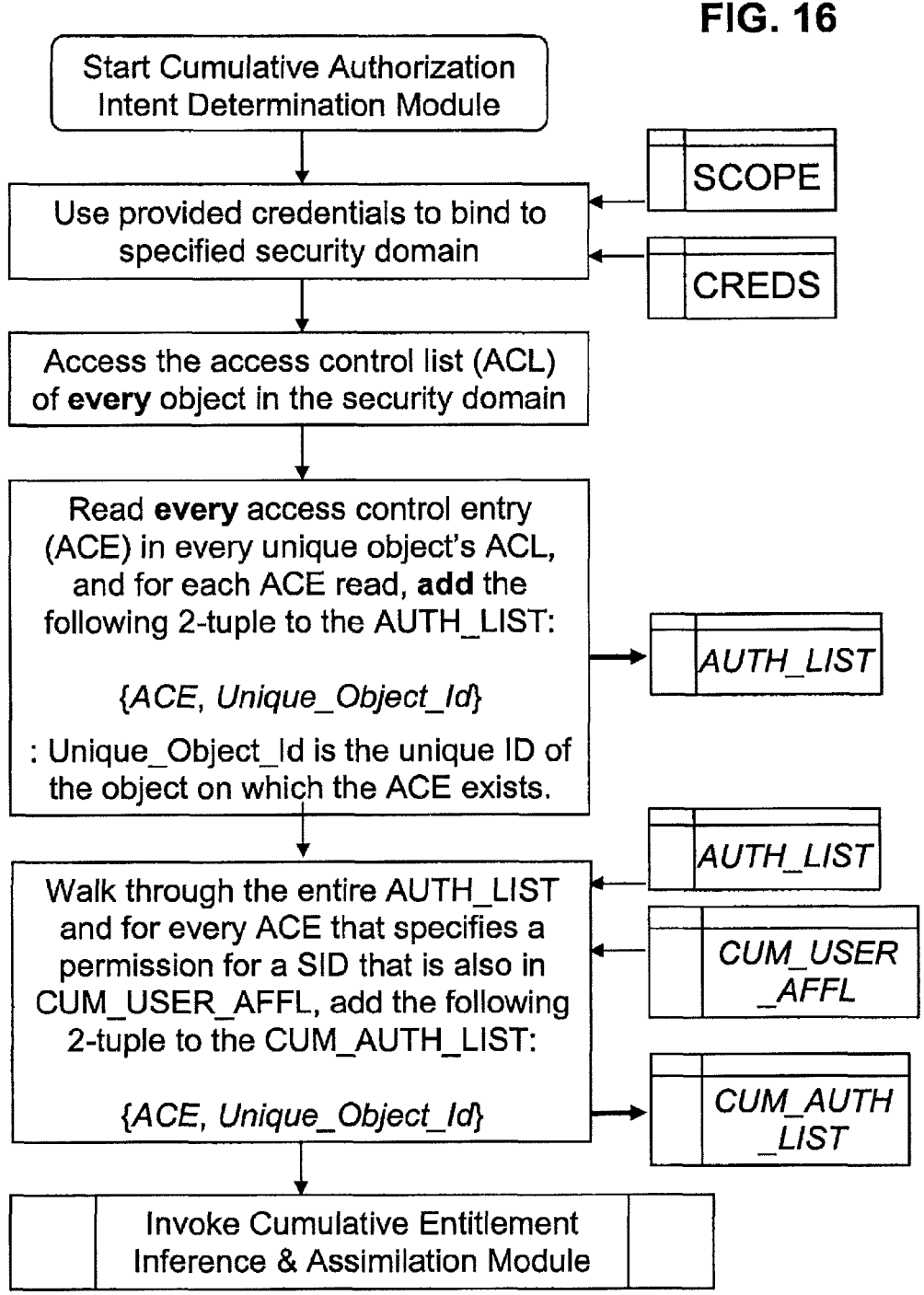
FIG. 16 discloses a flow chart which describes the operation of the Cumulative Authorization Intent Discovery module.

FIG. 16 discloses a flow chart which describes the operation of the Cumulative Authorization Intent Determination module.

This figure serves to describe the logic implemented in an embodiment of a Cumulative Authorization Intent Determination module.

The logic implemented in this module binds to the security domain specified in the globally available SCOPE variable by using the client specified credentials CREDS, or in the absence of any specified credentials, using the default credentials. Binding generally involves authenticating to the security domain with valid credentials.

The logic implemented in this module then walks the through the entire set of securable resources in the security domain and examines in-depth the access control list (ACL) of each one of these securable resources.

NOTE: In most operating systems, there exists the notion of a securable resource. A securable resource is one for which the access control facilities of the operating system can provide security. In most operating systems, securable resources are protected by some form of an authorization intent specification, most commonly referred to as an access control list, which may be comprised of a set of individual authorization intent specification, commonly referred to as access control entries, each one of which essentially expresses the access specified for a specific entity, such as a user or a set of users. The logic implemented by the Cumulative Authorization Intent Determination is capable of assessing and analyzing various kinds of collective and individual authorization intent specifications such as access control lists access control entries, role definitions, privileges, user-rights and any custom application or system security authorization intent specification forms used for access control in an information or operating system. One of the most pervasively used form of collective and individually used authorization intent specifications are access control lists (ACLs) and access control entries (ACEs) respectively, which are used in Microsoft's Windows family of operating systems to protect securable resources such as files, folders, directory service objects, registry hives and keys, etc. In light of this fact, the description of the methodology of this module uses ACLs and ACEs to illustrate how the operations involved in this module. The use of ACLs and ACEs is by no means an architectural limitation of the system.

In particular, the logic implemented in this module, examines every access control entry (ACE) in the ACL of each and every securable object in the security domain and it proceeds to build a list called AUTH_LIST, each member of which is a two-tuple that consists of an identical copy of the ACE and the unique object identifier (Unique_Object_ID) of the securable resource, in the ACL of which, the ACE was found. NOTE: It may be noted that every object in the security domain has a unique identifier that serves to uniquely identify that object.

In this manner, at the end of this sub-process, the AUTH_LIST contains a list of every ACE that exists in the security domain and associated with each ACE in this list is the unique object identifier that uniquely identifies the securable resource in the ACL of which the ACE was found.

The logic implemented in this module then takes the CUM_USER_AFFL list and the AUTH_LIST and proceeds to create a new list called CUM_AUTH_LIST (also available to all modules), which is meant to be a subset of the AUTH_LIST and contain only those members of AUTH_LIST, in which the ACE specifies some effective permission for a security identifier that also exists in the CUM_USER_AFFL.

It may be noted that CUM_AUTH_LIST now contains a list of every ACE in the security domain that specifies some permission on some securable resource for either the user him or herself or for some group to which the user belongs directly or transitively.

In effect, the CUM_AUTH_LIST list contains a list that is comprised of every authorization intent specification in the specified scope that specifies some access either for the user, or for some security group to which the user belongs, either directly, or indirectly. In addition, every member of this list also contains the unique identifier of the securable resource in the ACL of which this ACE exists.

Each entry in the CUM_AUTH_LIST table is a 2-tuple—{ACE, Unique_Object_Id}. It will be also apparent to those of ordinary skill in the art that this may be a highly intensive computation as it takes into account two potentially large lists CUM_USER_AFFL and AUTH_LIST, involves the examination of every ACE in the AUTH_LIST and for every such ACE, involves a comparison of the SD in this ACE with a large set of SIDs that exist in the CUM_USER_AFFL list to finally arrives at a third large list CUM_AUTH_LIST. In an effort to make this process more efficient, the implementation of this logic may employ the use of additional intermediate functions that make the SID comparisons more efficient by an order of magnitude.

NOTE: It may be noted that the system and method of this invention is not restricted or limited in any way to examination and evaluation of ACLs and ACEs. In fact, the system may very well handle a variety of different authorization intent specification types, each of which may be consumed by a variety of different resource managers. Thus, it should be recognized that in no way does the use of ACLs and ACEs in the description of the functionality of this module, or any other module, represent an architectural limitation for the present invention.

After the logic implemented by this module has successfully determined the user's cumulative set of authorization intents in the specified scope, it proceeds to invoke the Cumulative System-Level Access Determination module.

Figure 17:
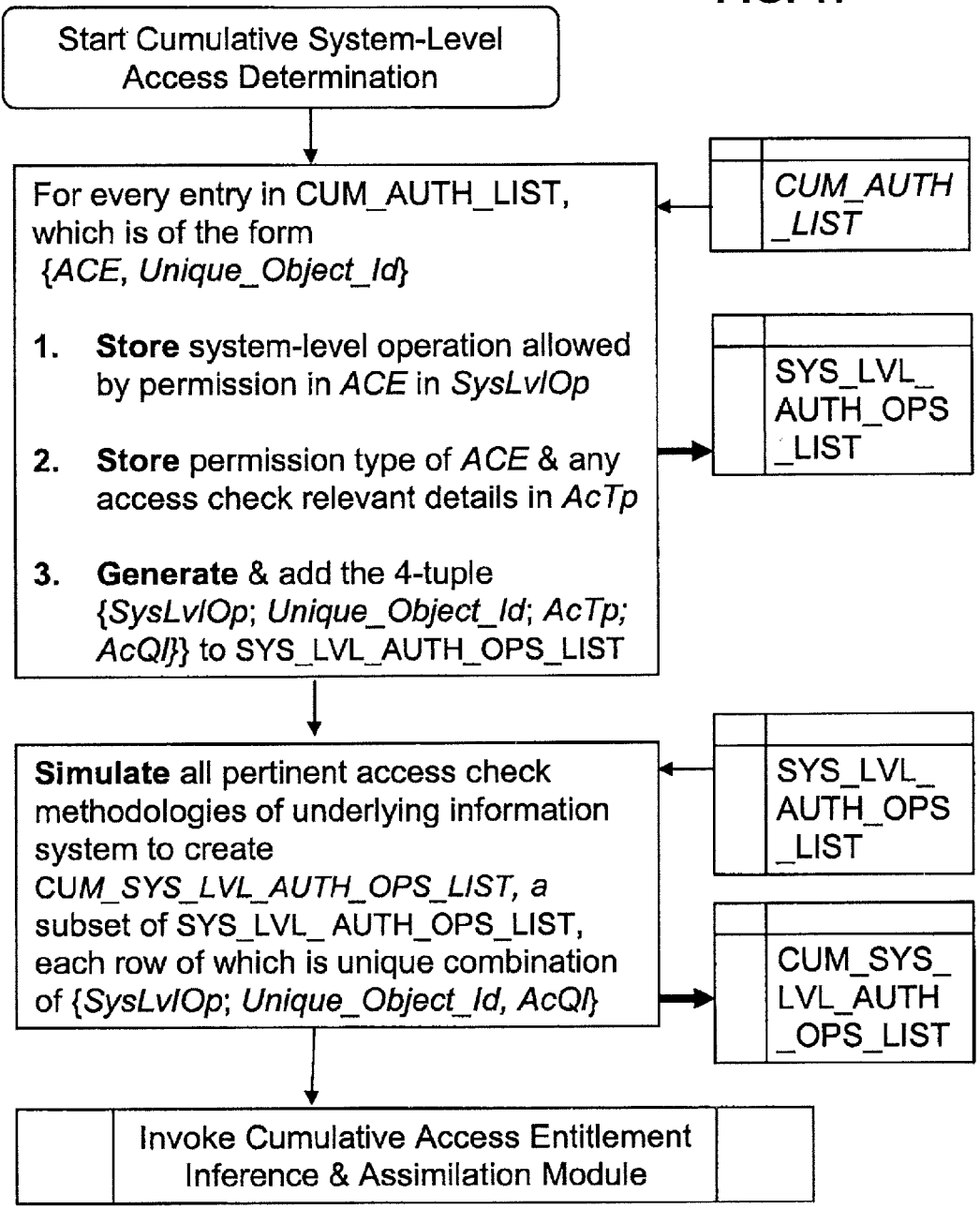
FIG. 17 discloses a flow chart which describes the operation of the Cumulative System-Level Access Determination module.

FIG. 17 discloses a flow chart which describes the operation of the Cumulative System-Level Access Determination module.

This figure serves to describe the logic implemented in an embodiment of a Cumulative System-Level Access Determination module.

The module is tasked with determining the cumulative effective set of system level access authorized to the user across the information system or a specified subset thereof.

This module takes as input the CUM_AUTH_LIST which is the list of all ACEs across the information system, or a specified subset thereof, each of which individually specify some permission on some securable resource for either the user him or herself or for some group to which the user belongs directly or transitively.

As mentioned previously, each entry in the CUM_AUTH_LIST table is a 2-tuple—{ACE, Unique_Object_Id} where ACE is the access control entry which contains (i) a permission such as Read, Write, Create, Delete etc., (ii) the identity of a subject for whom the permission is specified, (iii) the type of access i.e. allowed or denied and (iv) and any optional qualification in regards to the access. The ACE thus specifies the permissions authorized for some subject on the object it serves to protect, which is uniquely identified by Unique_Object_Id.

The logic implemented in this module analyzes the contents of each ACE in CUM_AUTH_LIST during which it evaluates the permission specified so as to determine the specific system-level operation that maps to the permission specified. For example, the Write Property permission maps to the Modify Attribute system-level operation on an object. In addition it also analyzes the type of access authorized by the ACE i.e. allowed or denied, and it additionally analyzes any optional access qualifications that may be present in the ACE, such as whether the basic system-level operation applies to a specific aspect of the resource, such as a single attribute or a set of attributes etc.

For each ACE analyzed, the logic implemented in this module creates a new 4-tuple combination which is comprised of {SysLvlPp; Unique_Object_Id; AcTp; AcQl}, wherein SysLvlOp refers to the specific system-level operation authorized, Unique_Object_Id refers to the unique identifier of the resource that the ACE serves to protect, and AcTp (short-form for access-type) denotes the nature of the authorization intent i.e. allowed or denied, and AcQl (short-form for access-qualifier) which may contain any optional qualifications, such as the unique identity of an attribute or a set of attributes or a unique class of objects etc. to which the authorized system-level operation is restricted.

Each of these 4-tuple combinations {SysLvlOp; Unique_Object_Id; AcTp; AcQl} is added to a new list called SYS_LVL_AUTH_OPS_LIST. Thus, each entry in this list specifies a specific system-level operation that is authorized for this user, specifies the unique resource on which this operation is authorized, denotes whether the system-level operation authorization is allowed or denied and finally specifies any qualifications pertaining to the system level operation authorized.

Note that thus far the contents of the SYS_LVL_AUTH_OPS_LIST together comprise the set of all system-level operations authorized for this user on a set of resources.

There could arise a situation wherein there exists an entry in SYS_LVL_AUTH_OPS_LIST that explicitly allows the execution of a specific system-level operation on a specific resource and there exists another entry that explicitly denies the execution of the same system-level operation on the same resource. In such a situation, the resultant or effective access would be a function of the rules implemented in the underlying information or operating system that determine how conflicting permissions are handled. For examples in certain operating systems, the rules would allow a deny permission to have precedence over the same allow permission.

The logic implemented in this module enforces the rules implemented in the underlying information or operating system that determine how conflicting permissions are handled. The knowledge of these rules is implemented in logic before hand by the designers of the system.

Note: The static implementation of such operating system specific access check pertinent rules in the system is not an architectural limitation of the system. If the underlying information or operating system provides the means by which the knowledge of such rules can be dynamically determined, the system is designed to be able to dynamically learn of and implement such rules.

In a similar manner, the logic implemented in this module takes into account all pertinent aspects of the access check algorithms implemented in the underlying information or operating systems to ensure that the methodology of assessing effective access in effect simulates the access check methodologies implemented in the underlying information or operating systems, in that the outcome of the effective simulation matches the outcome of the actual access check performed by the underlying information/operating system for a given user and a given securable resource, or a set thereof.

Note: The static implementation of such operating system specific access check pertinent rules in the system is by no means an architectural limitation of the system. If the underlying information or operating system provides the means by which the knowledge of such rules can be dynamically determined, the system, in some embodiments, may be capable of dynamically learning of and implementing such rules.

Thus, the logic implemented in this module takes into account all access check pertinent rules such as pertinent to permission conflict resolution rules, ACE precedence and effectiveness rules etc. in the underlying information or operating system, so as to ensure that all authorizations conflicts are resolved and as a result it generates a new list called CUM_SYS_LVL_AUTH_OPS_LIST which contains a unique set of only those system-level operations that are effectively authorized i.e. allowed.

Each member of the new list, CUM_SYS_LVL_AUTH_OPS_LIST consists of a 3-tuple {SysLvlOp; Unique_Object_Id; AcQl} which differs from SYS_LVL_AUTH_OPS_LIST only in that the AcTp field is absent as it is no longer needed. (It was only needed earlier for conflict resolution between any entries that were identical in the 3-tuple {SysLvlOp; Unique_Object_Id; AcQl}.

In this manner, the logic implemented in this module determines the resultant or effective system level access authorized for the user across the information or operating system.

For example, consider the following illustrative example. Assume that a specific ACE on a node of type container in a directory service authorizes the user the ability to create only objects of class user underneath this container. The representation of this authorization would be expressed as follows in an entry in the CUM_SYS_LVL_AUTH_OPS_LIST—{CC, 3456778-5677889-32348976, user}. Here, CC is the SysLvlOp code for the Create Child system level operation, 3456778-5677889-32348976 is the Unique_Object_Id that uniquely represents the instance of this specific container node in the directory service, and user is the code used in the AcQl field to denote that the Create Child system level operation code is further qualified to be authorize only the creation of objects of class user.

Thus, at the end of the execution of the logic of this Cumulative System-Level Access Determination module, the contents of CUM_SYS_LVL_AUTH_OPS_LIST represent the effective system level access authorized for the user across the information or operating system.

Note: It may be noted that the need to determine the system-level operation authorized by some permission in an authorization intent specification does not represent an architectural limitation of the system. If the nature of permissions used in the underlying operating system is such that there is either a one to one correspondence between the permission specified and the corresponding system-level operations authorized, or there exists a one to one correspondence between the permission specified and the corresponding administrative task entitled, then the need to determine the set of all system-level operations may be obviated, since the system could directly use a set of mappings from permissions to administrative tasks. In either case though, there will still a need to determine the effective permission on a securable resource taking into account the set of all authorization intent specifications that protect that securable resource. If it is the case that there is a one to one correspondence between the permission specified and the corresponding system-level operations authorized, then in effect the permission substitutes for the system-level operation in the mapping table, thereby obviating the need to determine the system-level operations but not obviating the need to then determine the effective permissions on that securable resource.

After the logic implemented by this module has successfully determined the user's cumulative system level access across the specified scope, it proceeds to invoke the Cumulative Access Entitlement Inference & Assimilation module.

Figure 18:
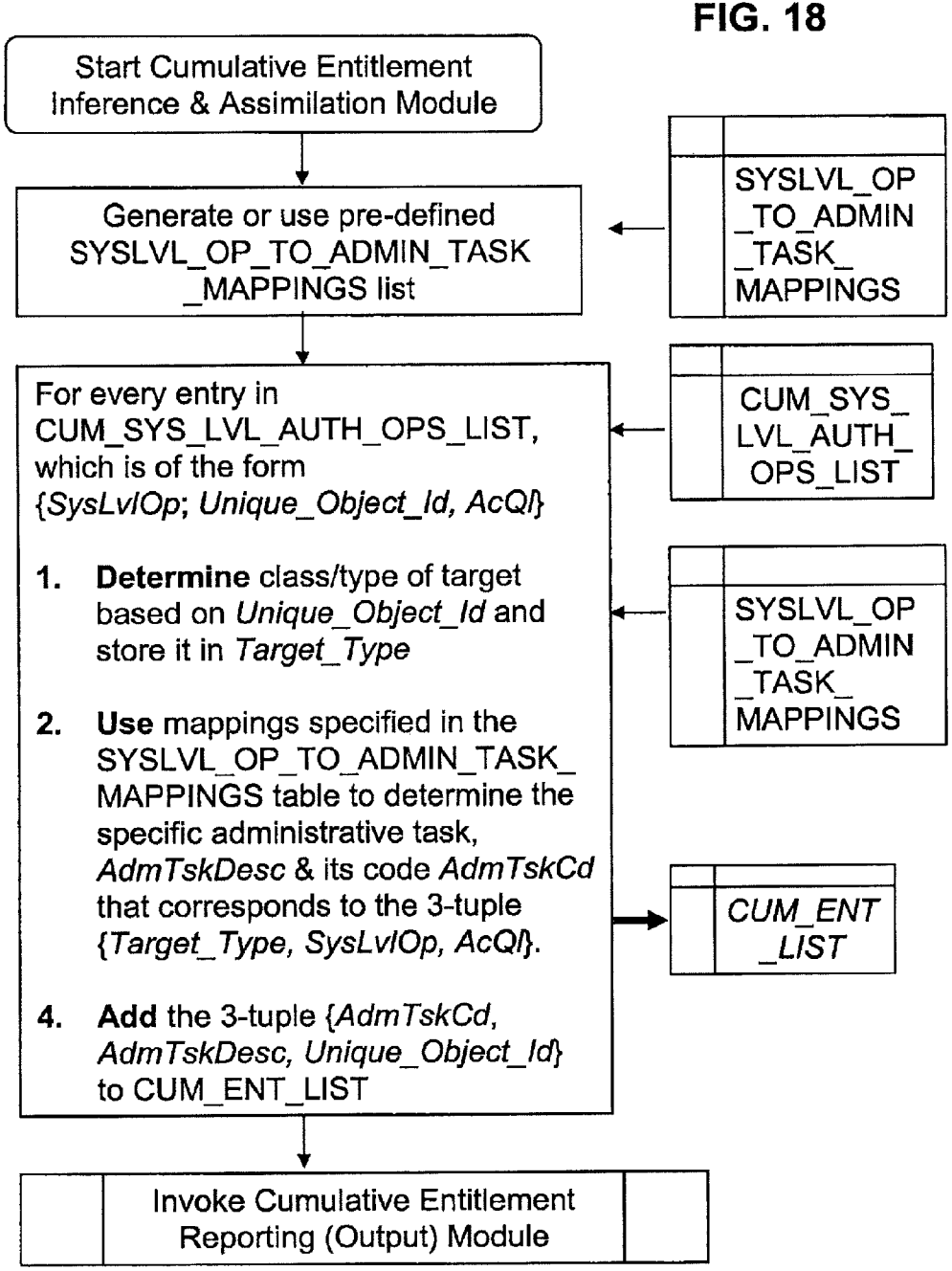
FIG. 18 discloses a flow chart which describes the operation of the Cumulative Entitlement Inference & Assimilation module.

FIG. 18 discloses a flow chart which describes the operation of the Cumulative Entitlement Inference & Assimilation module.

This figure serves to describe the logic implemented in an embodiment of a Cumulative Entitlement Inference & Assimilation module.

The logic implemented in this module begins by either dynamically generating or loading a static pre-defined list of system-level operation to administrative task mappings, into memory. This list is then held in the global variable SYSLVL_OP_TO_ADMIN_TASK_MAPPINGS.

The SYSLVL_OP_TO_ADMIN_TASK_MAPPINGS contains a set of target resource specific system-level operation to administrative task mappings. In particular, the list contains one entry for each combination of (i) an operating system specific class/type of resource, (ii) a system-level operation and (iii) an optional access qualifier. For each such entry, there exists a task code and a task description for the administrative task that corresponds to this combination.

The optional access qualifier provides the means to take into account the optional qualification of specified access, such as the representation of the unique identity of an attribute or a set of attributes or a unique class of objects etc. to which the authorized system-level operation is restricted.

Thus, each entry of this list takes the form:
[Target Type: System Level Operation: Access Qualifier: Task Code Id: "Task Description"]

The following is what the contents of an entry in the list looks like in teens of fields used above:

istrative task that corresponds to this combination. It then takes the description of the administrative task, AdmTskDesc and the administrative task's unique code, AdmTskCd, and adds the 3-tuple {AdmTskCd, AdmTskDesc, Unique_Object_Id} to the CUM_ENT_LIST (also a global variable available to all modules).

[Target_Type: SysLvlOp: AcQl: AdmTskCd: AdmTskDesc]
The following is an illustrative example of what an actual list would look like:

| | | |
|---|---|---|
| Directory Service Container Class Object: | CC (Create-Child): User: | 01:"Create a user account" |
| Directory Service Container Class Object: | CC Create-Child: Group: | 02:"Create a security group" |
| Directory Service User Class Object: | SD (Delete):    NULL: | 03:"Delete a user account" |
| Directory Service Group Class Object: | SD (Delete):    NULL: | 04:"Delete a group account" |
| Directory Service Group Class Object: | RP (Read Attrib): Member: | 05:"Query a group's membership" |
| Directory Service Group Class Object: | WP (Modify Attrib): Member: | 06:"Modify a group's membership" |
| ... | | |
| Directory Service User Class Object: | WP (Modify Attrib): Acct-Status: | 26:"Disable a user account" |
| ... | | |
| File System File Object: | SD (Delete):    NULL: | 89: "Delete File" |
| ... | | |
| System Security Policy Object: | WP (Modify Attrib): Logon-Behavior: | 149:"Control System Logon Behavior" |

In effect, the 5-tuple SYSLVL_OP_TO_ADMIN_TASK_MAPPINGS list contains 2-tuple administrative task mappings {AdmTskCd: AdmTskDesc} for each unique combination of the 3-tuple {Target_Type: SysLvlOp: AcQl}.

The logic implemented in this module proceeds to sequentially analyze every entry in the CUM_SYS_LVL_AUTH_OPS_LIST.

Note that each entry of the CUM_SYS_LVL_AUTH_OPS_LIST consists of the 3-tuple {SysLvlOp; Unique_Object_Id, AcQl} where SysLvlOp specifies the specific system-level operations that the user is authorized to perform on the unique resource uniquely identified by Unique_Object_Id and where AcQl may optionally contain specific information that qualifies the nature of authorization expressed for the system-level operation denoted by SysLvlOp.

The analysis of each entry in CUM_SYS_LVL_AUTH_OPS_LIST involves a simple determination of the operating system specific target type, of the target uniquely identified by Unique_Object_Id. This determination is required to arrive at the 3-tuple {Target_Type: SysLvlOp: AcQl} from the 3-tuple {SysLvlOp; Unique_Object_Id, AcQl}. This simple determination can be made by binding to i.e. accessing the unique object identified by Unique_Object_Id and determining its specific class/object type. This determined value is then stored in the Target_Type.

Once the Target_Type determination has been made the logic implemented in this module has sufficient information to use the mappings in the SYSLVL_OP_TO_ADMIN_TASK_MAPPINGS list to determine the administrative task that corresponds to the unique combination of (i) Target_Type, the specific class or type of resource/object that the resource uniquely identified by Unique_Object_Id, (ii) SysLvlOp, the specific system-level operation and (iii) AcQl field, which may contain specific information that qualifies the nature of authorization expressed for the system-level operation denoted by SysLvlOp.

The logic implemented in this module then proceeds to use the SYSLVL_OP_TO_ADMIN_TASK_MAPPINGS list to determine the administrative task that corresponds to the unique combination of {Target_Type: SysLvlOp: AcQl} for each entry.

In particular, the logic uses the 3-tuple combination {Target_Type: SysLvlOp: AcQl} to determine the specific admin- The above mentioned sequential analysis process is performed for every entry in CUM_SYS_LVL_AUTH_OPS_LIST.

The logic implemented in this module then proceeds to eliminate any duplicate 3-tuple combinations of {AdmTskCd, AdmTskDesc, Unique_Object_Id} in CUM_ENT_LIST. Duplicates could arise if there could potentially exist multiple overlapping authorized system-level operations that all effectively authorize the same administrative task.

At the end of the logic implemented by this module, the CUM_ENT_LIST contains a unique list of all administrative tasks that the user is entitled to performing and additionally lists all the targets on which the user can perform a specific administrative task.

NOTE: It may be noted that there is no strict requirement to use a static pre-defined list. For example, if the operating system underlying an information system provides the means by which the mappings between system-level operations (as authorized by the presence of corresponding permissions in ACEs) and corresponding high-level administrative tasks can be dynamically determined by the access assessment system, then such a facility would obviate the need for a hard-coded list. In the presence of such a facility, the logic implemented in this module would in some embodiments proceed to dynamically generate this list. In the absence of such a facility though, a static pre-defined list is required to map permissions to administrative tasks.

In regards to the putting together of a pre-defined static list, the designers of this system may avail of a variety of means to put this list together. Such means may include but not be limited to the inclusion of authoritative information secured from published documentation from the vendors of the operating systems, experimentally obtained knowledge of such mappings etc. In this manner, the logic of this module successfully determines the user's cumulative set of entitlements. After the logic implemented by this module has successfully determined the user's cumulative set of entitlements, it proceeds to invoke the Invoke Cumulative Entitlement Reporting (Output) module.

Figure 19:
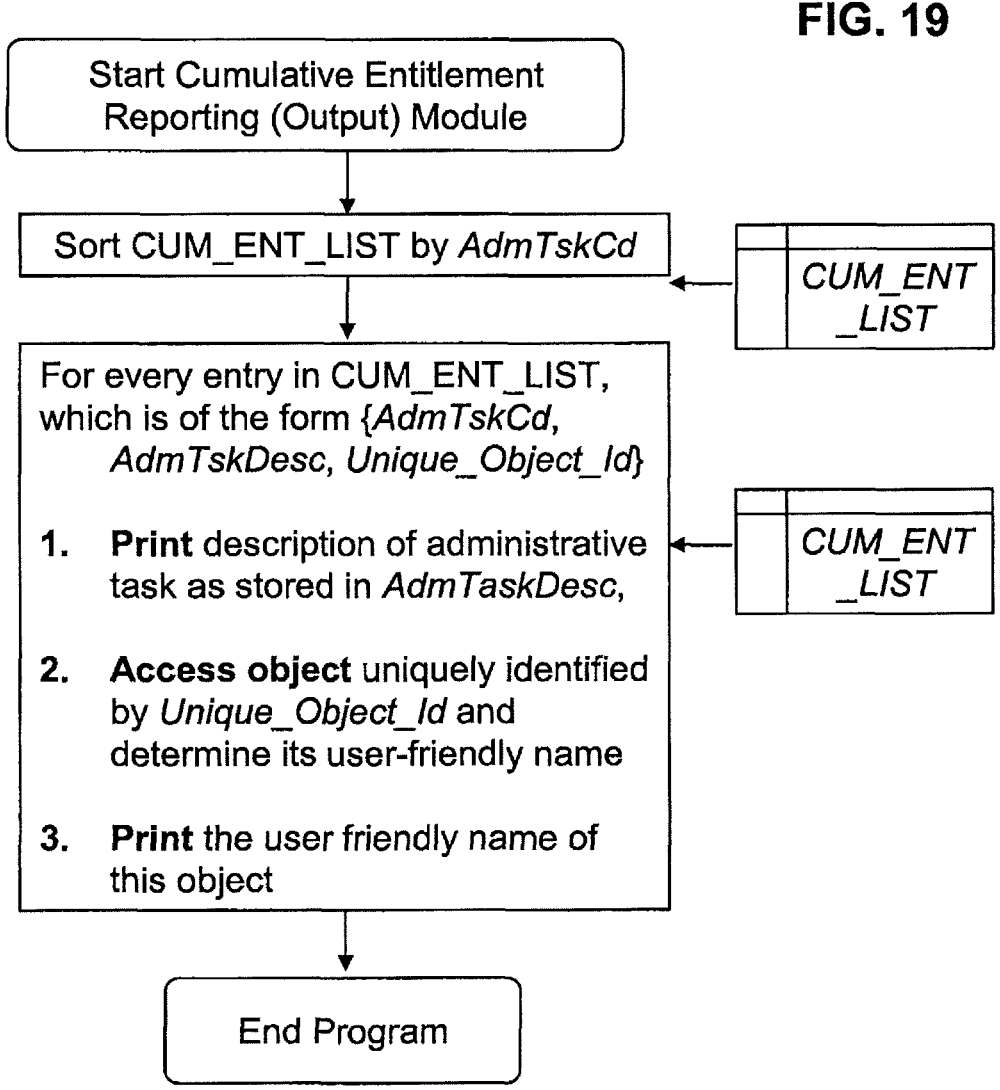
FIG. 19 discloses a flow chart which describes the operation of the Cumulative Entitlement Reporting (Output) module.

FIG. 19 discloses a flow chart which describes the operation of the Cumulative Entitlement Reporting (Output) module.

This figure serves to describe the logic implemented in an embodiment of a Cumulative Entitlement Reporting (Output) module.

The logic implemented in this module begins by sorting the CUM_ENT_LIST by the administrative task codes, which are stored in the field AdmTaskCd.

Note: The sort operation is not a strict requirement. It is merely intended to provide sorted output to the client of the assessment system.

Then, for each entry in CUM_ENT_LIST, the logic implemented in this module proceeds to print the description of the administrative task, available in the AdmTskDesc field and it additionally prints the user-friendly name of the object on which the administrative task is entitled. It determines the user-friendly name of the object by binding to the object uniquely identified by Unique_Object_Id and determining the object's user-friendly name.

When it is done processing this list, the output of this process may look similar to that depicted in FIG. 20.

In this manner, the logic of this module successfully outputs the user's cumulative set of entitlements to the client. After the logic implemented by this module has been successfully output, control is passed back to the control flow engine which may decide to end this assessment process or optionally allow the user to perform an assessment for another user.

FIG. 20 depicts a sample of the cumulative assessment report that this system might furnish to the client of this system.

This figure depicts a fictional sample cumulative assessment report the type of which an embodiment of this system might furnish to the client of this system.

As is illustrated, the cumulative entitlement assessment method and system provides a list of all administrative tasks that a specific user of the system is entitled to performing, by virtue of the presence of a very large number of individual authorization intent specifications that exist across a large number of information and IT assets located on various hosts and in various file-systems, databases and directories etc. that the information system is comprised of.

It may be noted that the information furnished is meaningful, highly actionable and valuable to all administrators in the system.

I claim:

1. A method, performed by a computer, with regard to analyzing cumulative entitlements in an information system including a plurality of users, each user having a corresponding user account, the information system including a plurality of roles, each role having none or a subset of the users or other roles assigned to it, and wherein the information system includes a plurality of securable assets, each securable asset corresponding to an access control list, each access control list including access control entries that identify at least one role or user account having access to the corresponding securable asset, the method comprising:

in the computer, determining which roles a given one of the users is assigned to directly or transitively;

in the computer, determining a set of access control lists that identify any of the identified roles or the given user;

in the computer, determining an effective system-level access granted to the given user in view of the access control entries in the set of access control lists, wherein determining the effective system-level access includes resolving any access conflicts as a function of operating system rules or according to access check methodologies, wherein an access check methodology is defined as the process by which access control mechanisms of the information system protect the securable assets, by subjecting a user's access request to a given securable asset, to an access check that processes the user's security affiliations as defined by the user's roles assignments and the access control list corresponding to the given securable asset to determine whether to allow the access requested; and in the computer, mapping the effective system-level access granted to the given user into tasks to determine a cumulative access entitlement set for the given user, wherein the cumulative access entitlement set includes tasks that the given user is entitled to perform with regard to the securable assets corresponding to the set of access control lists.

2. The method of claim 1, further comprising determining a cumulative set of all tasks that all users in the information system are authorized to perform, in at least a portion of the information system.

3. The method of claim 1, further comprising determining a subset of the users that are entitled to perform a specific task in at least a portion of the information system.

4. The method of claim 1, further comprising determining a set of the access control lists that authorize the user to perform a specific task.

5. The method of claim 1, further comprising determining a set of all securable assets that a specific one of the users is authorized access to across at least a portion of the information system.

6. The method of claim 1, further comprising determining whether the set of access control lists were a part of a default (system vendor specified) entitlements conferred upon the users of the information system.

7. The method of claim 1, further comprising determining excessive entitlements granted to the given user, wherein the determination of excessive entitlements involves comparing a set of intended access entitlements with the given user's cumulative access entitlement set.

8. The method of claim 1, further comprising whether the given user's cumulative access entitlement set is in compliance with a business security policy governing a protection of the securable assets.

9. The method of claim 1, further comprising determining security vulnerabilities that exist as a result of the given user's cumulative access entitlement set.

10. The method of claim 1, further comprising determining a set of security privilege escalation paths that exist across at least a portion of the information system as a result of a presence of insecure access control lists pertaining to the given user's cumulative access entitlement set.

11. The method of claim 1, further comprising modifying a state of an assessed entitlement for the given user.

12. The method of claim 1, further comprising determining access related security risk indicators, across at least a portion of the information system.

13. The method of claim 1, further comprising determining time-period based differences in the cumulative entitlements for the given user.

14. The method of claim 1, further comprising reporting the given user's cumulative access entitlement set to a client of the information system.

15. The method of claim 1, wherein at least some of the information for determining the given user's cumulative entitlement set is obtained on a secure channel.

16. A computer-implemented system for analyzing cumulative entitlements in an information system including a plurality of users, each user having a corresponding user account, the information system including a plurality of roles, each role having none or a subset of the users or other roles assigned to it, and wherein the information system includes a plurality of securable assets, each securable asset corresponding to an access control list, each access control list including access control entries that identify at least one role or user account having access to the corresponding securable asset, comprising:

a computing device configured to, for a given one of the users, determining which roles are assigned to the user directly or transitively;

the computing device being further configured to determine a set of access control lists that identify any of the identified roles or the given user;

the computing device being further configured to determine an effective system-level access granted to the given user in view of the access control entries in the set of access control lists, wherein the determination of the effective system-level access includes resolving any access conflicts as a function of operating system rules or according to access check methodologies, wherein an access check methodology is defined as the process by which access control mechanisms of the information system protect the securable assets, by subjecting a user's access request to a given securable asset, to an access check that processes the user's security affiliations as defined by the user's roles assignments and the access control list corresponding to the given securable asset to determine whether to allow the access requested; and the computing device being further configured to map the effective system-level access granted to the given user into tasks to determine a cumulative access entitlement set for the given user, wherein the cumulative access entitlement set includes tasks that the given user is entitled to perform with regard to the securable assets corresponding to the set of access control lists.

17. The system of claim 16, wherein the computing device is further configured to determine a cumulative set of all tasks that all users in the information system are authorized to perform, in at least a portion of the information system.

18. The system of claim 16, wherein the computing device is further configured to determine a subset of the users that are entitled to perform a specific task in at least a portion of the information system.

19. The system of claim 16, wherein the computing device is further configured to determine a set of the access control lists that authorize the user to perform a specific task.

20. The system of claim 16, wherein the computing device is further configured to determine a set of all securable assets that a specific one of the users is authorized access to across at least a portion of the information system.

21. The system of claim 16, wherein the computing device is further configured to determine whether the set of access control lists were a part of a default (system vendor specified) entitlements conferred upon the users of the information system.

22. The system of claim 16, wherein the computing device is further configured to determine excessive entitlements granted to the given user, wherein the determination of excessive entitlements involves comparing a set of intended access entitlements with the given user's cumulative access entitlement set.

23. The system of claim 16, wherein the computing device is further configured to determine whether the given user's cumulative access entitlement set is in compliance with a business security policy governing a protection of the securable assets.

24. The system of claim 16, wherein the computing device is further configured to determine security vulnerabilities that exist as a result of the given user's cumulative access entitlement set.

25. The system of claim 16, wherein the computing device is further configured to determine a set of security privilege escalation paths that exist across at least a portion of the information system as a result of a presence of insecure access control lists pertaining to the given user's cumulative access entitlement set.

26. The system of claim 16, wherein the computing device is further configured to modify a state of an assessed entitlement for the given user.

27. The system of claim 16, wherein the computing device is further configured to determine access related security risk indicators, across at least a portion of the information system.

28. The system of claim 16, wherein the computing device is further configured to determine time-period based differences in the cumulative entitlements for the given user.

29. The system of claim 16, wherein the computing device is further configured to report the given user's cumulative access entitlement set to a client of the information system.

30. The system of claim 16, wherein at least some of the information for determining the given user's cumulative entitlement set is obtained on a secure channel.

* * * * *

UNITED STATES PATENT AND TRADEMARK OFFICE
CERTIFICATE OF CORRECTION

| | |
|---|---|
| PATENT NO. | : 9,241,011 B2 |
| APPLICATION NO. | : 14/493161 |
| DATED | : January 19, 2016 |
| INVENTOR(S) | : Sanjay Tandon |

Page 1 of 1

It is certified that error appears in the above-identified patent and that said Letters Patent is hereby corrected as shown below:

Specification

In column 51, line 7:

Change the word "teens" to --"terms"--

Signed and Sealed this
Twenty-sixth Day of April, 2016

Michelle K. Lee
*Director of the United States Patent and Trademark Office*